(12) United States Patent
Cheng et al.

(10) Patent No.: US 12,116,442 B2
(45) Date of Patent: Oct. 15, 2024

(54) METHOD FOR PRODUCING SILICONE HYDROGEL CONTACT LENSES

(71) Applicant: Alcon Inc., Fribourg (CH)

(72) Inventors: Jing Cheng, Suwanee, GA (US); Yang Zheng, Alpharetta, GA (US); Steve Yun Zhang, Sugar Hill, GA (US); Lindsay Olson, Atlanta, GA (US)

(73) Assignee: Alcon Inc., Fribourg (CH)

( * ) Notice: Subject to any disclaimer, the term of this patent is extended or adjusted under 35 U.S.C. 154(b) by 833 days.

(21) Appl. No.: 17/313,459

(22) Filed: May 6, 2021

(65) Prior Publication Data

US 2021/0347929 A1 Nov. 11, 2021

Related U.S. Application Data

(60) Provisional application No. 63/021,334, filed on May 7, 2020.

(51) Int. Cl.
*C08F 283/12* (2006.01)
*C08J 3/075* (2006.01)

(52) U.S. Cl.
CPC ............. *C08F 283/12* (2013.01); *C08J 3/075* (2013.01); *C08J 2383/10* (2013.01)

(58) Field of Classification Search
None
See application file for complete search history.

(56) References Cited

U.S. PATENT DOCUMENTS

| | | |
|---|---|---|
| 4,136,250 A | 1/1979 | Mueller et al. |
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek et al. |
| 4,327,203 A | 4/1982 | Deichert |
| 4,341,889 A | 7/1982 | Deichert |
| 4,343,927 A | 8/1982 | Chang |

(Continued)

FOREIGN PATENT DOCUMENTS

| | | |
|---|---|---|
| CN | 1040081 C | 10/1998 |
| CN | 103865067 A | 6/2014 |

(Continued)

*Primary Examiner* — Peter A Salamon
(74) *Attorney, Agent, or Firm* — Jian Zhou

(57) ABSTRACT

The invention provides a contact lens manufacturing method comprising a process for removing unprocessed molded silicone hydrogel contact lenses from mold halves in a relatively efficient and consistent manner. The method of the invention involves using a silicone fluid (or so-called silicone oil) as non-reactive diluent in SiHy lens formulation for making SiHy contact lenses. Resultant SiHy contact lenses cast-molded from such a SiHy lens formulation can have a significantly reduced adhesion force with the molding surfaces of a lens mold and consequently a higher efficiency and consistency in removing unprocessed molded SiHy contact lenses from mold halves can be achieved. This method of the invention can be easily implemented in a production environment for enhancing the production yield.

19 Claims, 5 Drawing Sheets

(56) References Cited

U.S. PATENT DOCUMENTS

| | | |
|---|---|---|
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,534,916 A | 8/1985 | Wichterle |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,929,693 A | 5/1990 | Akashi |
| 4,929,707 A | 5/1990 | Nagata et al. |
| 4,946,923 A | 8/1990 | Nagata et al. |
| 4,954,586 A | 9/1990 | Toyohima |
| 4,954,587 A | 9/1990 | Mueller |
| 5,010,141 A | 4/1991 | Mueller |
| 5,013,496 A | 5/1991 | Nagata et al. |
| 5,021,503 A | 6/1991 | Nagata et al. |
| 5,034,461 A | 7/1991 | Lai |
| 5,039,761 A | 8/1991 | Ono et al. |
| 5,070,170 A | 12/1991 | Robertson et al. |
| 5,070,215 A | 12/1991 | Bambury |
| 5,079,319 A | 1/1992 | Mueller |
| 5,126,388 A | 6/1992 | Nagata et al. |
| 5,166,345 A | 11/1992 | Akashi |
| 5,264,161 A | 11/1993 | Druskis et al. |
| 5,271,875 A * | 12/1993 | Appleton ......... B29D 11/00576 264/2.6 |
| 5,346,946 A | 9/1994 | Yokoyama et al. |
| 5,358,995 A | 10/1994 | Lai |
| 5,387,632 A | 2/1995 | Lai |
| 5,416,132 A | 5/1995 | Yokoyama et al. |
| 5,449,729 A | 9/1995 | Lai |
| 5,451,617 A | 9/1995 | Lai |
| 5,466,147 A | 11/1995 | Appleton et al. |
| 5,486,579 A | 1/1996 | Lai |
| 5,542,978 A | 8/1996 | Kindt-Larsen et al. |
| 5,594,088 A | 1/1997 | Nagata et al. |
| 5,753,730 A | 5/1998 | Nagata et al. |
| 5,760,100 A | 6/1998 | Nicolson et al. |
| 5,843,346 A * | 12/1998 | Morrill ............ B29D 11/00076 425/808 |
| 5,894,002 A * | 4/1999 | Boneberger ..... B29D 11/00125 264/2.6 |
| 5,962,548 A | 10/1999 | Vanderlaan et al. |
| 5,981,675 A | 11/1999 | Valint et al. |
| 6,017,121 A | 1/2000 | Chateau |
| 6,019,914 A | 2/2000 | Lokshin |
| 6,039,913 A | 3/2000 | Hirt et al. |
| 6,113,814 A | 9/2000 | Gemert |
| 6,149,841 A | 11/2000 | Kumar |
| 6,166,236 A | 12/2000 | Bambury |
| 6,296,785 B1 | 10/2001 | Nelson |
| 6,348,604 B1 | 2/2002 | Nelson |
| 6,367,929 B1 | 4/2002 | Maiden et al. |
| 6,673,457 B2 | 1/2004 | Takahashi et al. |
| 6,719,929 B2 * | 4/2004 | Winterton ........ B29D 11/00048 264/1.7 |
| 6,762,264 B2 | 7/2004 | Kuenzler et al. |
| 6,822,016 B2 | 11/2004 | McCabe et al. |
| 6,849,210 B2 | 2/2005 | Bothe et al. |
| 6,860,600 B2 | 3/2005 | Chen |
| 6,867,245 B2 | 3/2005 | Iwata et al. |
| 6,921,802 B2 | 7/2005 | Kuenzler |
| 7,214,809 B2 | 5/2007 | Zanini et al. |
| 7,318,937 B2 | 1/2008 | Jonn et al. |
| 7,423,074 B2 | 9/2008 | Lai |
| 7,462,668 B2 | 12/2008 | Lu et al. |
| 7,540,609 B2 | 6/2009 | Chen |
| 7,556,750 B2 | 7/2009 | Xiao |
| 7,572,841 B2 | 8/2009 | Chen |
| 7,584,630 B2 | 9/2009 | Van |
| 7,605,190 B2 | 10/2009 | Moszner et al. |
| 7,789,507 B2 | 9/2010 | Zanini et al. |
| 7,858,000 B2 | 12/2010 | Winterton |
| 7,999,989 B2 | 8/2011 | Asai |
| 8,147,897 B2 | 4/2012 | Ferreiro et al. |
| 8,158,037 B2 | 4/2012 | Chopra |
| 8,163,206 B2 | 4/2012 | Chang et al. |
| 8,231,218 B2 | 7/2012 | Hong |
| 8,409,599 B2 | 4/2013 | Wu |
| 8,415,405 B2 | 4/2013 | Maggio |
| 8,440,735 B2 | 5/2013 | Pruitt et al. |
| 8,475,529 B2 | 7/2013 | Clarke |
| 8,476,337 B2 | 7/2013 | Chen |
| 8,480,227 B2 | 7/2013 | Qiu |
| 8,529,057 B2 | 9/2013 | Qiu |
| 8,530,590 B2 | 9/2013 | Hu et al. |
| 8,552,085 B2 | 10/2013 | Hong |
| 8,557,334 B2 | 10/2013 | Wu et al. |
| 8,614,261 B2 | 12/2013 | Iwata et al. |
| 8,658,748 B2 | 2/2014 | Liu et al. |
| 8,697,770 B2 | 4/2014 | Duis |
| 8,741,188 B2 | 6/2014 | Chopra |
| 8,835,525 B2 | 9/2014 | Kuyu |
| 8,993,651 B2 | 3/2015 | Chang |
| 9,052,438 B2 | 6/2015 | Xiao |
| 9,097,840 B2 | 8/2015 | Chang et al. |
| 9,097,916 B2 | 8/2015 | Chopra et al. |
| 9,102,083 B2 | 8/2015 | David |
| 9,103,965 B2 | 8/2015 | Chang |
| 9,156,214 B2 | 10/2015 | Norris |
| 9,187,601 B2 | 11/2015 | Huang |
| 9,193,118 B2 | 11/2015 | Siddiqui |
| 9,217,813 B2 | 12/2015 | Liu |
| 9,272,473 B2 | 3/2016 | Hong |
| 9,315,669 B2 | 4/2016 | Holland et al. |
| 9,440,376 B2 | 9/2016 | Mao et al. |
| 9,465,234 B2 | 10/2016 | Chopra et al. |
| 9,475,827 B2 | 10/2016 | Chang et al. |
| 9,498,924 B2 | 11/2016 | Norris et al. |
| 9,505,184 B2 | 11/2016 | Kolluru et al. |
| 9,567,488 B2 | 2/2017 | Fish |
| 9,804,417 B2 | 10/2017 | Hong |
| 9,904,074 B2 | 2/2018 | Duis et al. |
| 10,081,697 B2 | 9/2018 | Huang et al. |
| 10,197,707 B2 | 2/2019 | Xiao et al. |
| 10,301,451 B2 | 5/2019 | Jing et al. |
| 10,465,047 B2 | 11/2019 | Jing et al. |
| 2009/0218705 A1 | 9/2009 | Patterson et al. |
| 2012/0026457 A1 | 2/2012 | Qiu |
| 2016/0001468 A1 | 1/2016 | Clarke et al. |
| 2016/0185914 A1* | 6/2016 | Ueyama ................ C08L 83/12 556/437 |
| 2016/0326046 A1* | 11/2016 | Quinter ................ G02C 7/049 |
| 2018/0081197 A1 | 3/2018 | Qiu et al. |
| 2018/0104919 A1* | 4/2018 | Lu .................... B29D 11/00192 |
| 2018/0169981 A1* | 6/2018 | Liu ........................ B29C 43/50 |
| 2019/0085000 A1 | 3/2019 | Hyun, II et al. |

FOREIGN PATENT DOCUMENTS

| | | |
|---|---|---|
| CN | 105121588 A | 12/2015 |
| CN | 105399954 A | 3/2016 |
| EP | 1224073 A1 | 7/2002 |
| EP | 1131197 B1 | 9/2004 |
| EP | 1626849 B1 | 1/2007 |
| EP | 1870735 B1 | 3/2009 |
| EP | 2744632 B1 | 1/2016 |
| KR | 101761456 B1 | 7/2017 |
| KR | 101841016 B1 | 3/2018 |
| KR | 101918645 B1 | 11/2018 |
| TW | 500769 B | 9/2002 |
| WO | 9304848 A1 | 3/1993 |
| WO | 0107523 A1 | 2/2001 |
| WO | 03095171 A2 | 11/2003 |

* cited by examiner

METHOD FOR PRODUCING SILICONE HYDROGEL CONTACT LENSES

This application claims the benefit under 35 USC § 119 (e) of U.S. provisional application No. 63/021,334 filed 7 May 2020, herein incorporated by reference in its entirety.

The present invention is related to a method for producing silicone hydrogel contact lenses.

BACKGROUND OF THE INVENTION

Most commercially-available SiHy contact lenses are produced economically in large number in a manufacturing method which generally includes a molding process according to a cast molding technique involving use of disposable plastic molds typically consisting of two mold halves and use of a lens-forming (or polymerizable) composition (or so-called "lens formulation") including all necessary polymerizable components and optionally one or more organic solvents as non-reactive diluent(s). Following the curing (i.e., molding) of a lens formulation in molds, molds are opened (i.e., mold halves are separated from each other) and each of the molded SiHy contact lenses typically adheres to one of the two mold halves of each mold. The adhesion of a molded SiHy contact lens to a mold half can be quite strong. Moreover, where the lens formulation includes an organic solvent as non-reactive diluent, the molded SiHy contact lenses can be very soft and fragile. Removal (or delensing or releasing) of molded lenses, especially soft SiHy contact lenses, from mold halves by force may cause damages to the molded lenses (e.g., cracks, flaws and/or completely or partial tears). SiHy contact lenses released from molds then need to be subjected to various post-molding processes including extraction, hydration, packaging, and sterilization, etc. SiHy contact lenses having such defects have to be discarded and lower the overall production yield. A great of efforts have been made to develop methods for mold opening and lens releasing from the mold without damaging the lens.

One proposed method is to hydrate the lens, namely, a lens-in-mold assembly after mold separation is placed (i.e., soaked) in a tank filled with water or a liquid (e.g., an organic solvent or a mixture of solvents). Water or the liquid can swell the molded SiHy lenses to facilitate the release of SiHy contact lenses from molds. Often swelling alone does not release the lenses from the molds. The lenses must then be gently removed from molds by hand. Such hand-assisted lens releasing from molds increases the likelihood of lens damage. U.S. Pat. No. 5,264,161 discloses an improved method for releasing a lens from a mold, in which surfactants are added to the hydration bath to facilitate the release of lenses from molds. However, the utilization of surfactants in a liquid bath does not provide a more effortless mold separation. Lens damage incurred during mold separation may not be eliminated by soaking lenses.

Furthermore, because mold halves can take up valuable space in an extraction or hydration tank, it would be desirable to remove molded lenses from the lens-adhering mold halves before extraction and hydration processes. US 2018-0104919 A1 and US 2018-0169981 A1 disclose an apparatus and a method for removing molded lenses from mold halves by applying an ultrasonic vibrational energy to at least one area of the non-optical surface of a mold half having the molded silicone hydrogel contact lens adhered thereon. However, ultrasonic-assisted SiHy lens release may not have adequate efficiency and consistency in releasing silicone hydrogel contact lenses from mold halves and could still cause damages to the molded soft SiHy contact lenses and lower the product yield.

Another method is to apply external mold releasing agents (e.g., surfactants) in the form of a film or coating onto to the molding surfaces of a mold (e.g., those disclosed in U.S. Pat. Nos. 4,929,707 and 5,542,978 and WO03095171). When external mold releasing agents are used, a portion of the agents used for treating the molding surfaces of the mold can migrate to the surface and interior of the polymerized lens. Besides its questionable efficiency, such a method requires extra steps to be implemented in the product and can complicate the production.

A further method of lens release is to incorporate internal mold releasing agents into a lens formulation for making contact lenses. The internal mold releasing agent can be a surfactant (U.S. Pat. Nos. 4,534,916, 4,929,707, 4,946,923, 5,013,496, 5,021,503, 5,126,388, 5,594,088, and 5,753, 730), a non-polymerizable polymer (U.S. Pat. No. 6,849, 210), or a phospholipid (U.S. Pat. No. 8,440,735). By adding an internal mold releasing agent in a lens formulation, the adhesion between molds and lenses may be reduced, a relatively smaller force may be required to separate mold, and lenses may be removed from molds with less effort. A portion of the internal mold releasing agent need migrate to the interface between the lens formulation and the mold in order to be effective to reduce the adhesion between molds and lenses. However, the migration speed of the internal mold releasing agent from the lens formulation to the interface between the lens formulation and the mold may not be fast enough to effectively reduce the adhesion between molds and lenses.

U.S. Pat. No. 7,572,841 discloses use of a polyalkylene oxide silicone extractable component in a polymerizable composition comprising a fluorine-containing silicone vinylic macromer for making naturally-wettable SiHy contact lenses.

Therefore, there is still a need for a delensing process which can remove silicone hydrogel contact lenses from mold halves in a relatively efficient and consistent manner and which can be easily implemented in a production environment.

SUMMARY OF THE INVENTION

The invention is directed to a method for producing SiHy contact lenses, comprising the step of: (1) obtaining a polymerizable composition which is clear at room temperature, wherein the polymerizable composition comprises (a) at least 20% by weight of at least one siloxane-containing polymerizable component that comprises at least one siloxane-containing vinylic monomer, at least one polysiloxane vinylic crosslinker, or a combination thereof, (b) at least 20% by weight of at least one hydrophilic vinylic monomer, (c) from about 1% to about 30% by weight of at least one silicone fluid (or so-called silicone oil) which is capable of reducing mold separation force by at least 20% at room temperature compared to control formulation that comprises 1-propanol as sole non-reactive diluent and differs from the polymerizable composition only in non-reactive diluent, wherein said at least one silicone fluid is free of any ethylenically unsaturated group, does not participate in free-radical polymerization, and has a molecular weight or number-averaged molecular weight of about 2000 Daltons or less, and (d) at least one free radical initiator; (2) introducing the polymerizable composition into a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed; (3) curing thermally or actinically the polymerizable composition in the lens mold to form an unprocessed SiHy contact lens; (4) separating the lens mold obtained in step (5) into the male and female mold halves, with the unprocessed SiHy contact lens adhered on a lens-adhered mold half which is one of the male and female mold halves; (5) mechanically or manually removing the unprocessed SiHy contact lens from the lens-adhered mold half before the unprocessed SiHy contact lens is contact with water or any liquid; and (6) subjecting the unprocessed SiHy contact lens to one or more post-molding processes selected from the group consisting of extraction, hydration, surface treatment, packaging, sterilization, and combinations thereof.

The present invention provides the foregoing and other features, and the advantages of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

DESCRIPTION OF PREFERRED EMBODIMENTS

Figure 1:
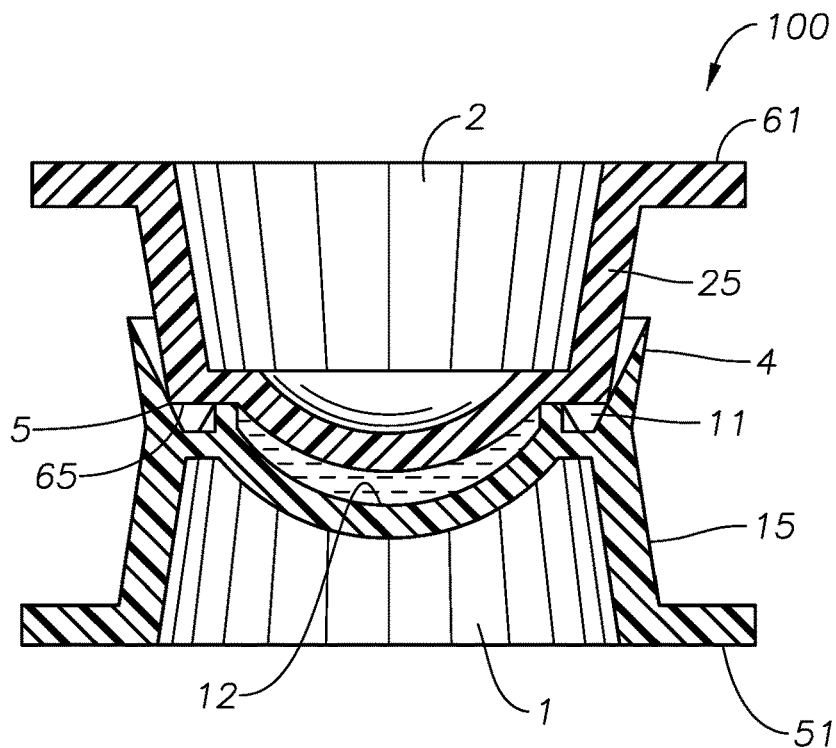
FIG. 1 is a cross-sectional view of a mold according to a preferred embodiment of the invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

A "hydrogel" or "hydrogel material" refers to a cross-linked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

The term "room temperature" refers to a temperature of about 21° C. to about 27° C.

The term "soluble", in reference to a compound or material in a solvent, means that the compound or material can be dissolved in the solvent to give a solution with a concentration of at least about 0.5% by weight at room temperature.

The term "insoluble", in reference to a compound or material in a solvent, means that the compound or material can be dissolved in the solvent to give a solution with a concentration of less than 0.01% by weight at room temperature.

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C=C< group. Exemplary ethylenically unsaturated groups include without limitation (meth)acryloyl

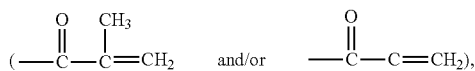

allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, e.g., UV/visible light irradiation, or the like. Thermal curing or actinic curing methods are well-known to a person skilled in the art.

An "acrylic monomer" refers to a vinylic monomer having one sole (meth)acryloyl group. Examples of acrylic monomers includes (meth)acryloxy [or (meth)acryloyloxy] monomers and (meth)acrylamido monomers.

An "(meth)acryloxy monomer" or "(meth)acryloyloxy monomer" refers to a vinylic monomer having one sole group of

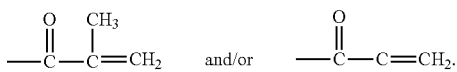

An "(meth)acrylamido monomer" refers to a vinylic monomer having one sole group of

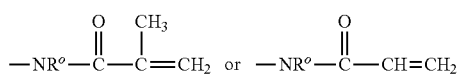

in which R° is H or $C_1$-$C_4$ alkyl.

A "vinylcarbonato monomer" refers to a vinylic monomer having one sole group of

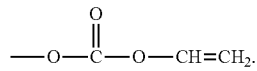

A "vinylcarbamato monomer" refers to a vinylic monomer having one sole group of

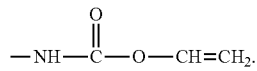

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=$CH_2$) that is directly attached to the nitrogen atom of the amide group.

The term "terminal ethylenically-unsaturated group" refers to one ethylenically-unsaturated group at one of the two ends of the main chain (or backbone) of an organic compound as known to a person skilled in the art. The term "terminal (meth)acryloyl group" refers to one (meth)acryloyl group at one of the two ends of the main chain (or backbone) of an organic compound as known to a person skilled in the art.

A "hydrophilic vinylic monomer", a "hydrophilic acrylic monomer", a "hydrophilic (meth)acryloxy monomer", a "hydrophilic (meth)acrylamide monomer", or a "hydrophilic N-vinyl amide monomer", as used herein, respectively refers to a vinylic monomer, an acrylic monomer, a (meth)acryloxy monomer, a (meth)acrylamido monomer), or a N-vinyl amide monomer, which typically yields a homopolymer that is water-soluble or can absorb at least 10 percent by weight of water at room temperature.

A "hydrophobic vinylic monomer", a "hydrophobic acrylic monomer", a "hydrophobic (meth)acryloxy monomer", a "hydrophobic (meth)acrylamide monomer", or a "hydrophobic N-vinyl amide monomer", as used herein, respectively refers to a vinylic monomer, an acrylic monomer, a (meth)acryloxy monomer, a (meth)acrylamido monomer), or a N-vinyl amide monomer, which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

A siloxane, which often also described as a silicone, refers to a molecule having at least one moiety of —Si—O—Si— where each Si atom carries at least two substituents (organic groups).

A silicone fluid, which often also described as a silicone oil, refers to a fluid polymerized siloxane with organic substituents.

A "polysiloxane segment" or "polydiorganosiloxane segment" interchangeably refers to a polymer chain segment (i.e., a divalent radical) of

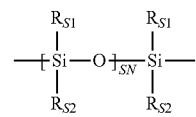

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma1}$—OR° (in which alk is $C_1$-$C_6$ alkylene diradical, R° is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, or a linear hydrophilic polymer chain, in which $R_{N1}$ and $R_{N1}'$ independent of each other are hydrogen or a $C_1$-$C_{15}$ alkyl.

A "polydiorganosiloxane vinylic crosslinker" or "polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture having a light transmissibility of 85% or greater (preferably 90% or greater) in the range between 400 to 700 nm.

A free radical initiator can be either a photoinitiator or a thermal initiator. A "photoinitiator" refers to a chemical that initiates free radical crosslinking/polymerizing reaction by the use of UV and/or visible light. A "thermal initiator" refers to a chemical that initiates radical crosslinking/polymerizing reaction by the use of heat energy.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatography) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy, etc.

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —NH$_2$, sulfhydryl (—SH), C$_1$-C$_4$ alkyl, C$_1$-C$_4$ alkoxy, C$_1$-C$_4$ alkylthio (alkyl sulfide), C$_1$-C$_4$ acylamino, C$_1$-C$_4$ alkylamino, di-C$_1$-C$_4$ alkylamino, and combinations thereof.

"Post-curing surface treatment", in reference to a SiHy bulk material or a SiHy contact lens, means a surface treatment process that is performed after the SiHy bulk material or the SiHy contact lens is formed by curing (i.e., thermally or actinically polymerizing) a SiHy lens formulation. A "SiHy lens formulation" refers to a polymerizable composition that comprises all necessary polymerizable components for producing a SiHy contact lens or a SiHy lens bulk material as well known to a person skilled in the art.

A "blending vinylic monomer" refers to a vinylic monomer capable of dissolving both hydrophilic and hydrophobic components of a polymerizable composition to form a solution.

A "non-optical surface of a mold half" refers to mold half surface which does not contact lens forming material during cast molding of a contact lens.

A "UV-absorbing vinylic monomer" refers to a compound comprising an ethylenically-unsaturated group and a UV-absorbing moiety which can absorb or screen out UV radiation in the range from 200 nm to 400 nm as understood by a person skilled in the art.

A "HEVL-absorbing vinylic monomer" refers to a compound comprising an ethylenically-unsaturated group and a HEVL-absorbing moiety which can absorb or screen out HEVL (high-energy-violet-light) radiation in the range from 380 nm to 440 nm as understood by a person skilled in the art.

The intrinsic "oxygen permeability", $Dk_i$, of a material is the rate at which oxygen will pass through a material. As used in this application, the term "oxygen permeability (Dk)" in reference to a hydrogel (silicone or non-silicone) or a contact lens means a corrected oxygen permeability ($Dk_c$) which is measured at about 34-35° C. and corrected for the surface resistance to oxygen flux caused by the boundary layer effect according to the procedures described in ISO 18369-4. Oxygen permeability is conventionally expressed in units of barrers, where "barrer" is defined as [(cm$^3$ oxygen)(cm)/(cm$^2$)(sec)(mm Hg)]×10$^{-9}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as [(cm$^3$ oxygen)/(cm$^2$)(sec)(mm Hg)]×10$^{-9}$.

The term "modulus" or "elastic modulus" in reference to a contact lens or a material means the tensile modulus or Young's modulus which is a measure of the stiffness of a contact lens or a material in tension. A person skilled in the art knows well how to determine the elastic modulus of a SiHy material or a contact lens. For example, all commercial contact lenses have reported values of elastic modulus.

A "coating" in reference to a contact lens means that the contact lens has, on its surfaces, a thin layer of a material that is different from the bulk material of the contact lens and obtained by subjecting the contact lens to a surface treatment.

"Surface modification" or "surface treatment", as used herein, means that an article has been treated in a surface treatment process, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897, 8,409,599, 8,557,334, 8,529,057, and 9,505,184.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (static water contact angle measured by Sessile Drop), which is obtained by averaging measurements of at least 3 individual contact lenses.

The term "demold yield" means that after curing, the percentage of molds each with a molded (unprocessed) SiHy contact lens therein can be successfully separated without causing any damages to unprocessed SiHy contact lenses, into male and female mold halves with the unprocessed SiHy contact lens adhered on a lens-adhered mold half which is one of the male and female mold halves.

The term "delens yield" means that after mold separation, the percentage of unprocessed SiHy contact lenses each adhered on a lens-adhered mold half can be successfully removed from the lens-adhered mold half without causing any damages to unprocessed contact lenses.

The invention is generally related to a contact lens manufacturing method comprising a process for removing unprocessed molded SiHy contact lenses from mold halves in a relatively efficient and consistent manner. The invention is partly based on the discovery that, by using a silicone fluid (or so-called silicone oil) as non-reactive diluent in SiHy lens formulation for making SiHy contact lenses, resultant SiHy contact lenses molded from such a SiHy lens formulation can have a significantly reduced adhesion force with the molding surfaces of a lens mold, as measured by the reduced mold separation forces at room temperature and higher demold and delens yields at room temperature. Consequently, a higher efficiency and consistency in removing (releasing) unprocessed molded SiHy contact lenses from mold halves can be achieved. This method of the invention can be easily implemented in a production environment for enhancing the production yield.

The invention provides a method for producing SiHy contact lenses, comprising the step of: (1) obtaining a polymerizable composition which is clear at room temperature, wherein the polymerizable composition comprises (a) at least 20% (preferably from about 20% to about 60%, more preferably from about 25% to about 55%, even more preferably from about 28% to about 52%) by weight of at least one siloxane-containing polymerizable component that comprises at least one siloxane-containing vinylic monomer, at least one polysiloxane vinylic crosslinker, or a combination thereof, (b) at least 20% (preferably from about 20% to about 60%, more preferably from about 25% to about 55%, even more preferably from about 28% to about 52%) by weight of at least one hydrophilic vinylic monomer, (c) from about 1% to about 30% by weight of at least one silicone fluid (or so-called silicone oil) which is capable of reducing mold separation force by at least 20% (preferably by at least 25%, more preferably by at least 30%) at room temperature compared to control formulation that comprises 1-propanol as sole non-reactive diluent and differs from the polymerizable composition only in non-reactive diluent, wherein said at least one silicone fluid is free of any ethylenically unsaturated group, does not participate in free-radical polymerization, and has a molecular weight or number-averaged molecular weight of about 2000 Daltons or less, and (d) at least one free radical initiator; (2) introducing the polymerizable composition into a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed; (3) curing thermally or actinically the polymerizable composition in the lens mold to form an unprocessed SiHy contact lens; (4) separating the lens mold obtained in step (3) into the male and female mold halves, with the unprocessed SiHy contact lens adhered on a lens-adhered mold half which is one of the male and female mold halves; (5) mechanically or manually removing the unprocessed SiHy contact lens from the lens-adhered mold half before the unprocessed SiHy contact lens is contact with water or any liquid; and (6) subjecting the unprocessed SiHy contact lens to one or more post-molding processes selected from the group consisting of extraction, hydration, surface treatment, packaging, sterilization, and combinations thereof.

In accordance with the invention, any siloxane-containing vinylic monomer can be used in the invention. Examples of preferred siloxane-containing vinylic monomers can be siloxane-containing (meth)acrylamido monomers, siloxane-containing (meth)acryloxy monomers, siloxane-containing vinylcarbonato monomers, or siloxane-containing vinylcarbamato monomers, each of which comprises a bis(trialkylsilyloxy)alkylsilyl group, a tris(trialkylsilyloxy)-silyl group, or a polysiloxane chain having 2 to 30 siloxane units and terminated with an alkyl, hydroxyalkyl or methoxyalkyl group. Such preferred siloxane-containing (meth)acrylamido monomers can be obtained from the commercial suppliers, or alternatively prepared according to known procedures, e.g., similar to those described in U.S. Pat. Nos. 5,070,215, 6,166,236, 6,867,245, 7,214,809, 8,415,405, 8,475,529, 8,614,261, 8,658,748, 9,097,840, 9,103,965, 9,217,813, 9,315,669, and 9,475,827, or by reacting a vinylic monomer having a reactive functional group (e.g., an acid chloride, acid anhydride, carboxyl, hydroxyl, amino, epoxy, isocyanate, aziridine, azlactone, or aldehyde group) with a siloxane-containing compound a reactive group selected from the group consisting of a hydroxyalkyl, an aminoalkyl, an alkylaminoalkyl, a carboxyalkyl, an isocyanatoalkyl, an epoxyalkyl, and an aziridinylalkyl, in the presence or absence of a coupling agent under coupling reaction conditions well known to a person skilled in the art.

In a preferred embodiment, a polymerizable composition of the invention comprises at least one siloxane-containing (meth)acrylamido monomer having a bis(trialkylsilyloxy)alkylsilyl group, a tris(trialkylsilyloxy)silyl group, or a polysiloxane chain having 2 to 30 siloxane units and terminated with an alkyl, hydroxyalkyl or methoxyalkyl group. Examples of such preferred siloxane-containing (meth)acrylamido monomers include without limitation those described later in this application.

In another preferred embodiment, a polymerizable composition of the invention comprises at least one siloxane-containing (meth)acryloxy monomer having a bis(trialkylsilyloxy)alkylsilyl group, a tris(trialkylsilyloxy)silyl group, or a polysiloxane chain having 2 to 30 siloxane units and terminated with an alkyl, hydroxyalkyl or methoxyalkyl group. Examples of such preferred siloxane-containing (meth)acryloxy monomers include without limitation those described later in this application.

In accordance with the invention, any polysiloxane vinylic crosslinkers can be used in this invention. Examples of preferred polysiloxane vinylic crosslinkers include without limitation α,ω-(meth)acryloxy-terminated polydimethylsiloxanes of various molecular weight; α,ω-(meth)acrylamido-terminated polydimethylsiloxanes of various molecular weight; α,ω-vinyl carbonate-terminated polydimethylsiloxanes of various molecular weight; α,ω-vinyl carbamate-terminated polydimethylsiloxane of various molecular weight; bis-3-methacryloxy-2-hydroxypropyloxypropyl polydimethylsiloxane of various molecular weight; N,N,N',N'-tetrakis(3-methacryloxy-2-hydroxypropyl)-alpha,omega-bis-3-aminopropyl-polydimethylsiloxane of various molecular weight; the reaction products of glycidyl methacrylate with amino-functional polydimethylsiloxanes; the reaction products of an azlactone-containing vinylic monomer (any one of those described above) with hydroxyl-functional polydimethylsiloxanes; polysiloxane-containing macromer selected from the group consisting of Macromer A, Macromer B, Macromer C, and Macromer D described in U.S. Pat. No. 5,760,100; polysiloxane vinylic crosslinkers disclosed in U.S. Pat. Nos. 4,136,250, 4,153,641, 4,182,822, 4,189,546, 4,259,467, 4,260,725, 4,261,875, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,449,729, 5,451,617, 5,486,579, 5,962,548, 5,981,675, 6,039,913, 6,762,264, 7,423,074, 8,163,206, 8,480,227, 8,529,057, 8,835,525, 8,993,651, 9,187,601, 10,081,697, 10,301,451, and 10,465,047.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (H), are described later in this application and can be prepared according to the procedures disclosed in U.S. patent Ser. No. 10/081,697.

Another class of preferred polysiloxane vinylic crosslinkers are vinylic crosslinkers each of which comprises one sole polydiorganosiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers are chain-extended polysiloxane vinylic crosslinkers each of which has at least two polydiorganosiloxane segments linked by a linker between each pair of polydiorganosiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 9,187,601, 10,301,451, and 10,465,047.

In accordance with the invention, any hydrophilic vinylic monomers can be used in the invention. Examples of preferred hydrophilic vinylic monomers are hydrophilic (meth)acrylamido monomer (as described later in this application), hydrophilic (meth)acryloxy monomer (as described later in this application), hydrophilic N-vinyl amide monomer (as described later in this application), methylene-containing pyrrolidone monomers (i.e., pyrrolidone derivatives each having a methylene group connected to the pyrrolidone ring at 3- or 5-position) (as described later in this application), vinyl ether monomers (as described later in this application), allyl ether monomers (as described later in this application), phosphorylcholine-containing vinylic monomers (as described later in this application), allyl alcohol, N-2-hydroxyethyl vinyl carbamate, N-vinyloxycarbonyl-β-alanine (VINAL), N-vinyloxycarbonyl-α-alanine, and combinations thereof.

In another preferred embodiment, polymerizable composition of the invention comprises at least one hydrophilic (meth)acrylamido monomer, preferably having 3 to 10 carbon atoms. Examples of preferred hydrophilic (meth)acrylamido monomers are described later in this application. It is believed that such hydrophilic (meth)acrylamido monomers can be used in increasing the glass transition temperature of a resultant silicone hydrogel material. It is also understood that any hydrophilic (meth)acrylamido monomers other than those specifically described later in this application can also be used in this invention.

In another preferred embodiment, a polymerizable composition of the invention comprises at least one hydrophilic N-vinyl amide monomer. Examples of preferred hydrophilic N-vinyl amide monomers are described later in this application. It is understood that any hydrophilic N-vinyl amide monomers other than those specifically described later in this application can also be used in this invention.

In another preferred embodiment, a polymerizable composition of the invention comprises at least one hydrophilic (meth)acryloxy monomer, preferably having 3 to 10 carbon atoms. Examples of preferred hydrophilic (meth)acryloxy monomers are described later in this application. It is understood that any hydrophilic (meth)acryloxy monomers other than those specifically described later in this application can also be used in this invention.

In a preferred embodiment, the sum of the amounts of components (a) and (b) is at least about 60% (preferably at least about 65%, more preferably at least about 70%, even more preferably at least about 75%) by weight relative to the total weight of the polymerizable composition.

In accordance with the invention, any silicone fluid can be used in the invention, so long as it is free of any ethylenically unsaturated group, does not participate in free-radical polymerization, and has a molecular weight or number-averaged molecular weight of about 2000 Daltons or less (based on $^1$H NMR spectroscopy). A silicone fluid can be composed of two or more siloxane units, the organic substituents of which independent of one another are selected from the group consisting of $C_1$-$C_{10}$ alkyl, $C_2$-$C_{10}$ hydroxyalkyl, $C_2$-$C_{10}$ aminoalkyl, hydroxyethoxy-$C_2$-$C_6$ alkyl, and perfluoro-substituted $C_1$-$C_{10}$ alkyl.

Examples of preferred silicone fluids include without limitation hexamethyldisiloxane, octamethyltrisiloxane, decamethyltetrasiloxane, dodecamethylpentasiloxane, tetradecamethylhexasiloxane, poly(dimethylsiloxane), hexamethylcyclotrisiloxane, octamethylcyckitetrasiloxane, decamethylcyclopentasiloxane, dodecamethylcyclohexasiloxane, (3-hydroxypropyl)pentamethyldisiloxane, (3-aminopropyl)pentamethyl-disiloxane, 1,3-bis(hydroxypropyl)tetramethyldisiloxane, 1,3-bis(3-hydroxyisobutyl)tetramethyl-disiloxane, 1,3-bis(4-hydroxybutyl)tetramethyldisiloxane, 1,3-bis(3-aminopropyl)tetramethyl-disiloxane, (γ-aminopropyl) heptamethyltrisiloxane, 3-(3-hydroxypropyl)-heptamethyltrisiloxane, 3-(3-aminopropyl) heptamethyltrisiloxane, 3-[hydroxy(polyethylenoxy)-propyl]heptamethyltrisiloxane, 1,3-bis(3-hydroxypropyl)-hexamethyltrisiloxane, 1,3-bis(3-aminopropyl) hexamethyltrisiloxane, 1,3-bis[hydroxy(polyethylenoxy)-propyl]hexamethyltrisiloxane, propyltris(trimethylsiloxy)

silane, hydroxypropyltris(trimethylsiloxy)silane, aminopropyl-tris(trimethylsiloxy)silane, N-methylaminopropyltris(trimethylsiloxy)silane, poly[dimethylsiloxane-co-(3-aminopropyl)methylsiloxane], poly{dimethylsiloxane-co-[3-(2-(2-hydroxyethoxy) ethoxy)-propyl]methylsiloxane}, mono-hydroxypropyl-, mono-butyl-terminated poly(dimethylsiloxane), mono-hydroxyethoxypropyl-, mono-butyl-terminated poly(dimethylsiloxane), mono-aminopropyl-, mono-butyl-terminated poly (dimethylsiloxane), α,ω-bis(hydroxypropyl)-terminated poly(dimethylsiloxane), α,ω-bis(hydroxyethoxypropyl)-terminated poly(dimethylsiloxane), α,ω-bis(aminopropyl)-terminated poly(dimethylsiloxane), poly(dimethylsiloxane-co-nonafluorohexylmethylsiloxane), and combinations thereof.

In a preferred embodiment, a polymerizable composition of the invention comprises hexamethyldisiloxane, octamethyltrisiloxane, decamethyltetrasiloxane, dodecamethylpentasiloxane, tetradecamethylhexasiloxane, poly(dimethylsiloxane), (3-hydroxypropyl)pentamethyldisiloxane, 1,3-bis(hydroxypropyl)tetramethyldisiloxane, 1,3-bis(3-hydroxyisobutyl)tetramethyl-disiloxane, 1,3-bis(4-hydroxybutyl)tetramethyldisiloxane, 3-(3-hydroxypropyl)-heptamethyltrisiloxane, 1,3-bis(3-hydroxypropyl)-hexamethyltrisiloxane, mono-hydroxypropyl-, mono-butyl-terminated poly(dimethylsiloxane), mono-hydroxyethoxypropyl-, mono-butyl-terminated poly (dimethylsiloxane), α,ω-bis(hydroxypropyl)-terminated poly(dimethylsiloxane), α,ω-bis(hydroxyethoxypropyl)-terminated poly(dimethylsiloxane), or combinations thereof.

In accordance with the invention, a polymerizable composition of the invention can comprise one or more organic solvent as non-reactive diluents in addition to said at least one silicone fluid, so long as it is present in an amount of not more than 40% by weight (preferably not more than 30% by weight, more preferably not more than 25% by weight, even more preferably not more than 20% by weight) relative the total weight of all non-reactive diluent.

Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. Preferably, a polymerizable composition is a solution of all the desirable components in water, 1,2-propylene glycol, a polyethyleneglycol having a molecular weight of about 400 Daltons or less, or a mixture thereof.

Preferably, any organic solvent having 1 to 8 carbon atoms can be used in the invention, so long as it has a boiling point of lower than 105° C. Examples of preferred organic solvents include without limitation, alcohols having 1 to 5 carbon atoms (e.g., methanol, ethanol, 1-propanol, isopropanol, sec-butanol, tert-butyl alcohol, tert-amyl alcohol), ketone having 3 to 5 carbon atoms (acetone, methyl ethyl ketone, methyl isopropyl ketone, methyl propyl ketone), ethyl acetate, heptane, methylhexane (various isomers), methylcyclohexane, dimethylcyclopentane (various isomers), 2,2,4-trimethylpentane, and mixtures thereof. Preferably, the organic solvent is an alcohol having 1 to 5 carbon atoms (e.g., ethanol, 1-propanol, isopropanol, sec-butanol, tert-butyl alcohol, tert-amyl alcohol, or combinations thereof). With a boiling point below 105° C., such an organic solvent could be evaporated to some extend at the post-curing heating step at a post-curing temperature higher than 105° C.

In accordance with the invention, a polymerizable composition of the invention can further comprise one or more hydrophobic non-silicone vinylic monomers. Examples of preferred hydrophobic non-silicone vinylic monomers can be non-silicone hydrophobic acrylic monomers (e.g., alkyl (meth)acrylates as described below, cycloalkyl (meth)acrylates as described below, phenyl methacrylate, (meth)acrylonitrile, etc.), fluorine-containing acrylic monomers (e.g., perfluorohexylethyl-thio-carbonyl-aminoethyl-methacrylate, perfluoro-substituted-$C_2$-$C_{12}$ alkyl (meth)acrylates described below, etc.), vinyl alkanoates (e.g., vinyl acetate, vinyl propionate, vinyl butyrate, vinyl valerate, etc.), vinyloxyalkanes (e.g., vinyl ethyl ether, propyl vinyl ether, n-butyl vinyl ether, isoputyl vinyl ether, cyclohexyl vinyl ether, t-butyl vinyl ether, etc.), substituted or unsubstituted styrenes as described below, vinyl toluene, vinyl chloride, vinylidene chloride, 1-butene, and combinations thereof.

Any suitable perfluoro-substituted-$C_2$-$C_{12}$ alkyl (meth) acrylates can be used in the invention. Examples of perfluoro-substituted-$C_2$-$C_{12}$ alkyl (meth)acrylates include without limitation 2,2,2-trifluoroethyl (meth)acrylate, tetrafluoropropyl (meth)acrylate, hexafluoro-iso-propyl (meth) acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth) acrylate, and combinations thereof.

In a preferred embodiment, one or more hydrophobic acrylic monomers and/or substituted or unsubstituted styrenes can be used in the invention as a reactive diluent for solubilizing other polymerizable components in a polymerizable composition of the invention, provided that it can form a homopolymer with a $T_g$ of at least about 60° C. (preferably at least about 70° C., more preferably at least about 80° C., even more preferably at least about 90° C.). It is believed that such a hydrophobic acrylic monomer can increase a $T_g$ of the dominant phase of a resultant silicone hydrogel material above the room temperature and may make the unprocessed silicone hydrogel lens precursor more rigid.

Examples of such hydrophobic acrylic monomers and substituted or unsubstituted styrenes include methyl methacrylate ($T_g$=105° C. of homopolymer), ethyl methacrylate ($T_g$=65° C. of homopolymer), isopropyl methacrylate ($T_g$=81° C. of homopolymer), sec-butyl methacrylate ($T_g$=60° C. of homopolymer), tert-butyl methacrylate ($T_g$=107° C. of homopolymer), cyclohexyl methacrylate ($T_g$=83° C. of homopolymer), isobornyl acrylate ($T_g$=94° C. of homopolymer), isobornyl methacrylate ($T_g$=110° C. of homopolymer), phenyl methacrylate ($T_g$=110° C. of homopolymer), 4-tert-butylstyrene ($T_g$=132° C. of homopolymer), 2-methylstyrene ($T_g$=120° C. of homopolymer), styrene ($T_g$=100° C. of homopolymer), 4-ethoxystyrene ($T_g$=86° C. of homopolymer), 2,4-dimethystyrene ($T_g$=112° C. of homopolymer), 2,5-dimethylstyrene ($T_g$=143° C. of homopolymer), 3,5-dimethylstyrene ($T_g$=104° C. of homopolymer), and combinations thereof. More preferably, methyl methacrylate, tert-butyl methacrylate, cyclohexyl methacrylate, isobornyl acrylate, isobornyl methacrylate, or a combination thereof is used in the invention. Even more preferably, methyl methacrylate, tert-butyl methacrylate, cyclohexyl methacrylate, or a combination thereof is used in the invention.

In accordance with the invention, a polymerizable composition of the invention can further comprise one or more non-silicone vinylic crosslinkers. Examples of preferred non-silicone vinylic cross-linking agents include without limitation those described later in this application. In accordance with the invention, the amount of a non-silicone vinylic crosslinker in a polymerizable composition of the invention is about 1.5% or less (preferably about 1.2% or less, more preferably from about 0.1% to about 1.0%) by weight relative to the total weight of all polymerizable components in the polymerizable composition.

In accordance with a preferred embodiment of the invention, a polymerizable composition of the invention can further comprise (but preferably comprises) one or more UV-absorbing vinylic monomers and optionally (but preferably) one or more UV/HEVL-absorbing vinylic monomers. The term "UV/HEVL-absorbing vinylic monomer" refers to a vinylic monomer that can absorb UV light and high-energy-violet-light (i.e., light having wavelength between 380 nm and 440 nm). Examples of UV-absorbing vinylic monomers and UV/HEVL-absorbing vinylic monomers are known to a person skilled in the art and are disclosed in the patents and patent application publications, e.g., U.S. Pat. No. 9,315,669, US 2018-0081197 A1, etc.

Any suitable UV-absorbing vinylic monomers and UV/HEVL-absorbing vinylic monomers can be used in a polymerizable composition of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acryloyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl) benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl- (UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9CI) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline) pyridobenzoxazines, polymerizable spiro(benzindoline) pyridobenzoxazines, polymerizable spiro(benzindoline) naphthoxazines, polymerizable spiro(indoline)-benzoxazines, polymerizable diarylethenes, and combinations thereof, as disclosed in U.S. Pat. Nos. 4,929,693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

In accordance with the invention, a free radical can be one or more photoinitiators or thermal initiators (i.e., thermal polymerization initiators).

Suitable photoinitiators are benzoin methyl ether, diethoxyacetophenone, a benzoylphosphine oxide, 1-hydroxycyclohexyl phenyl ketone and Darocurand Irgacur types, preferably Darocur 1173® and Darocur 2959®, acylgermanium photoinitiators.

Examples of benzoylphosphine initiators include 2,4,6-trimethylbenzoyldiphenyl-phosphine oxide; bis-(2,6-dichlorobenzoyl)-4-N-propylphenylphosphine oxide; and bis-(2,6-dichlorobenzoyl)-4-N-butylphenylphosphine oxide.

Any acylgermanium photoinitiators can be used in this invention, so long as they are capable of initiating a free-radical polymerization under irradiation with a light source including a light in the region of about 420 to about 500 nm. Examples of acylgermanium photoinitiators are acylgermanium compounds described in U.S. Pat. No. 7,605,190. Preferably, the monomer of the polymerizable composition comprises at least one of the following acylgermanium compounds.

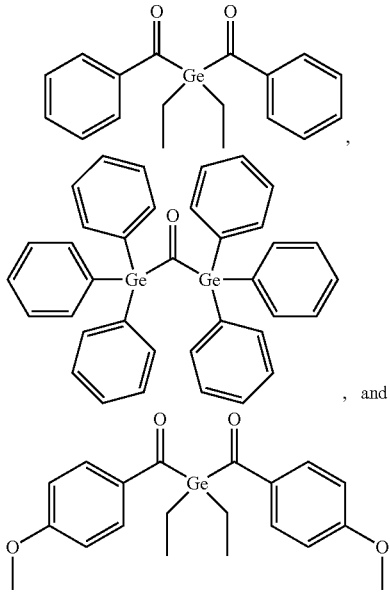
, and

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

A polymerizable composition of the invention can also comprise other necessary components known to a person skilled in the art, such as, for example, a visibility tinting agent (e.g., one or more polymerizable dyes, pigments, or mixtures thereof), antimicrobial agents (e.g., preferably silver nanoparticles), a bioactive agent, leachable lubricants, leachable tear-stabilizing agents, mold releasing agent, and mixtures thereof, as known to a person skilled in the art.

A polymerizable composition of the invention can be prepared by blending all of the desirable components including non-reactive diluent(s) according to any known techniques.

Lens molds for making contact lenses including SiHy contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with the polymerizable composition.

Methods of manufacturing mold sections for cast molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a mold.

In general, a mold comprises at least two mold halves (or mold sections), one male half and one female mold half. The male mold half has a first molding (or optical) surface which is in direct contact with a polymerizable composition for cast molding of a contact lens and defines the posterior (concave) surface of a molded contact lens; and the female mold half has a second molding (or optical) surface which is in direct contact with the polymerizable composition and defines the anterior (convex) surface of the molded contact lens. The male and female mold halves are configured to receive each other such that a lens-forming cavity is formed between the first molding surface and the second molding surface.

FIG. 1 schematically illustrates a preferred mold 100 used in the methods of the invention. The mold 100 comprises a female mold half 1 and male mold half 2.

The male mold half 2 comprises a base 61, a substantially cylindrical body 25 which extends upward from base 61, a posterior molding surface defining the posterior (concave) surface of a molded contact lens, and an annular shoulder 65 which surrounds the posterior molding surface. The posterior molding surface protrudes outward from the top of body 25. The annular shoulder 65 shown is flat. It is understood that the annular shoulder 65 can have any suitable surface, such as, e.g., a tilted surface.

The female mold half 1 comprises a base 51, a substantially cylindrical body 15 which extends upward from base 51, an anterior molding surface defining the anterior (convex) surface of a molded contact lens, and a collar 4. The anterior molding surface recesses downward from the top of the body 15. Collar 4 (or up-protruding flange) is preferably integral part of the female mold half 1 and protrudes upward from the top of the body 15. A circumferential groove (or recess) 11 is formed on top of the body 15 between the anterior molding surface and functions as an overflow for any excess unpolymerized lens-forming material.

The term "collar" as used herein refers to a peripheral circular part which protrudes upward from the top of body of one of the two mating mold halves. A collar can be attached to or preferably integral part of that mold half and which can encircle the other mold half to provide a tight seal between the two mold halves. It is understood that the collar can be provided on either of the male and female mold halves.

The female mold half 1 and a male mold half 2 are configured to receive each other such that a contact lens forming cavity 12 is formed between the anterior and posterior molding surfaces. The collar 4 encircles the body 25 of the male mold half 2 to provide a tight seal 5 between the female and male mold halves when the mold is closed. Typically, there is no lens material in the seal.

In operation, mold halves 1 and 2 can be first injection molded from a plastic resin in an injection molding apparatus, as well known to a person skilled in the art. A specific amount of a polymerizable lens-forming material is typically dispensed into the female mold half 1 by means of a dispensing device and then the male mold half 2 is put on and the mold 100 is closed (FIG. 1). As the mold 100 closes, any excess unpolymerized lens-forming material is pressed into an overflow 11 provided on the female mold half 1. Subsequently, the polymerizable composition in the closed mold 100 is cured thermally in an oven or actinically with UV/visible irradiation.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In accordance with the invention, the polymerizable composition can be introduced (dispensed) into a cavity formed by a mold according to any known methods. A specific amount of a polymerizable lens-forming material is typically dispensed into a female mold half by means of a dispensing device and then a male mold half is put on and the mold is closed. As the mold closes, any excess unpolymerized lens-forming material is pressed into an overflow provided on the female mold half (or alternatively on the male mold half).

The closed mold containing the polymerizable composition subsequently is cured (i.e., polymerized) thermally or actinically.

In a preferred embodiment, the curing step is carried out actinically, i.e., irradiating the closed mold containing the polymerizable composition with a UV or visible light, as known to a person skilled in the art, to produce a molded unprocessed silicone hydrogel lens precursor.

Where the polymerizable composition comprises at least one member selected from the group consisting of a UV-absorbing vinylic monomer, a HEVL-absorbing vinylic monomer, a polymerizable photochromic compound, the free radical initiator is a visible light photoinitiator (e.g., a benzoylphosphine initiator and/or an acylgermanium photoinitiator) and crosslinking is initiated upon exposure to a visible light in a region between 420 nm to 500 nm to crosslink the polymerizable components in the polymerizable composition to form molded unprocess SiHy contact lenses. Light source can be any ones emitting light in the 420-500 nm range sufficient to activate acylgermanium photoinitiators. Blue-light sources are commercially available and include: the Palatray CU blue-light unit (available from Heraeus Kulzer, Inc., Irvine, Calif.), the Fusion F450 blue light system (available from TEAMCO, Richardson, Tex.), Dymax Blue Wave 200, LED light sources from Opsytec (435 nm, 445 nm, 460 nm), and the GE 24" blue fluorescent lamp (available from General Electric Company, U.S.). A preferred blue-light source is the LED from Opsytec (those described above).

In a preferred embodiment, the curing step is carried out thermally in an oven to produce a molded unprocessed silicone hydrogel lens precursor. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, e.g., under $N_2$ or Ar atmosphere. Preferably, the oven with the molds therein is purged with nitrogen by flowing nitrogen gas through the oven. It is understood that the thermal curing step can be carried out at one or more curing temperatures as known to person skilled in the art and illustrated in Examples.

Where the curing step is carried out thermally, preferably any organic solvent present in the polymerizable composition has a boiling point of lower than 105° C. (preferably about 100° C. or lower, more preferably about 95° C. or lower, even more preferably about 90° C. or lower). The thermal curing step is carried out in an oven at one or more curing temperatures of from about 45° C. to about 100° C. under a nitrogen environment for at least 45 minutes (preferably at least 60 minutes, more preferably at least 90 minutes, even more preferably at least 120 minutes) to form an unprocessed silicone hydrogel lens contact lens, wherein the nitrogen environment in the oven is maintained by flowing nitrogen gas through the oven at a first flow rate. The method of the invention further comprises a post-curing treatment process that include the steps of: raising oven temperature to a post-curing temperature of about 105° C. or higher (preferably at least about 110° C., more preferably at least about 115° C., even more preferably at least about 120° C.) while increasing the flow rate of nitrogen gas through the oven to a second flow rate which is at least about 1.5 folds (preferably at least about 2.0 folds, more preferably at least about 3.0 folds, even more preferably at least about 4.0 folds) of the first flow rate; heating the lens mold with the unprocessed silicone hydrogel contact lens therewithin in the oven at the post-curing temperature under nitrogen gas flow through the oven at the second flow rate for at least about 30 minutes (preferably at least about 60 minutes, more preferably at least about 90 minutes, even more preferably at least about 120 minutes).

Figure 2:
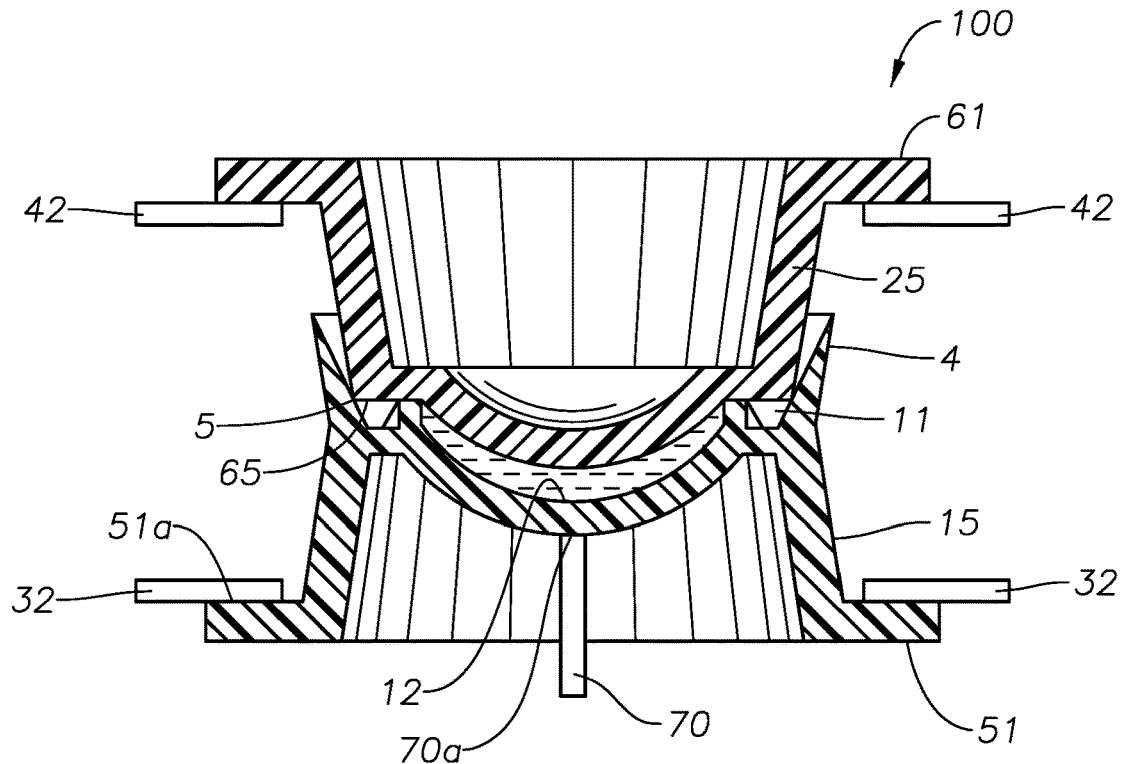
FIG. 2 illustrates schematically a process for separating the male and female mold halves of a lens-forming mold according to the invention and an apparatus for performing a method of the invention.

After curing and optionally the post-curing treatment, the molds can be opened according to any techniques known to a person skilled in the art. For example, one can perform the mold opening operation as follows. First, applying a force to non-optical surface of the female mold at a location about the center area of non-optical molding surface at an angle of less than about 30 degrees, preferably less than about 10 degrees, most preferably less than about 5 degrees (i.e., in a direction substantially normal to center area of non-optical molding surface) relative to the axis of the mold to deform the female mold half which breaks the bonds between the optical molding surface of the female mold half and the molded lens, as shown in FIG. 2. Various ways of applying a force to non-optical surface of the female mold half at a location about the center area of non-optical molding surface along the axis of the mold to deform the female mold half which breaks the bonds between the optical molding surface of the female mold half and the molded lens. It is understood that the mold-opening device can have any configurations known to a person skilled in the art for performing the function of separating two mold halves from each other. For example, referring to FIG. 2, the demolding assembly comprises a pin 70 positionable against the center area of non-optical molding surface of the female mold half. The pin 70 has a flat free end 70a to enable a surface contact between the free end 70a and the center area of non-optical molding surface of the female mold half. It will be appreciated that the scope of the invention is not limited to such a particular flat configuration of the pin end 70a, for example, the pin may have a rounded free end. In the present embodiment, the pin 70 is movable and the female mold half remains stationary by applying a restraining force to the female mold half with a first prying finger 32 for maintaining the female mold half in a fixed position. However, it is possible to arrange the assembly so that the female mold half is movable and the pin 70 remains stationary, or so that both the pin 70 and the female mold half can be moved relative to each other.

In use, during the demolding operation, the free end 70a of the pin 70 applies a longitudinally directed force to the central portion of the non-optical surface of the female mold half. The first prying finger 32 applies a counteractive force against the end face 51a of the base 51 of the female mold half 1. Consequently, the female mold half is compressed between the free end 70a of the pin 70 and the first finger 32. The compression force deforms the curved part of the female mold half and breaks the adhesive bond between the molding surface of the female mold half 1 and the anterior surface of the molded lens.

Then, apply a vertical lifting movement to the male mold half with a second prying finger 42 (while maintaining the restraints on the female mold so as to effectuate gradual separation between the female mold and the male mold.

After breaking the bond between the optical molding surface of the female mold half and the molded lens, the mold is separated, the molded unprocessed contact lens adheres to the male mold half 2. It is surprising to find out that, according to the present invention, the molded contact lens adhering to the male mold half even though the molding surfaces of the female mold and male mold are not treated before or after dispensing a specific amount of a polymerizable lens-forming material into one of the mold halves to render the molded contact lens preferentially adhered to the female mold or male mold when separating the mold.

According to the present application as mentioned above, the lens typically remains adhered to the male mold section. However, by using similar principle, the compression can be applied to the applying a force to non-optical surface of the male mold half at a location about the center area of non-optical molding surface along the longitudinal axis of the mold to deform the male mold half to compress the female mold half between the pin and the first set of pry fingers so as to break the bonds between the optical molding surface of the male mold half and the molded lens, thereby the molded lens adheres to the female mold half after separating the mold.

Preferably, the step of removing the unprocessed silicone hydrogel contact lens from the lens-adhered mold half, before the unprocessed silicone hydrogel contact lens is contact with water or any liquid, is performed by (a) bring a ultrasonic horn in direct contact with at least one area of a non-optical surface of the lens-adhered mold half having the unprocessed silicone hydrogel lens precursor attached thereon and (b) applying a ultrasonic vibrational energy of from about 0.2 to about 18 J to the at least one area of the non-optical surface of the lens-adhered mold half having the unprocessed silicone hydrogel contact lens adhered thereon so as to remove the unprocessed silicone hydrogel contact lens from the lens-adhered mold half.

Figure 3:
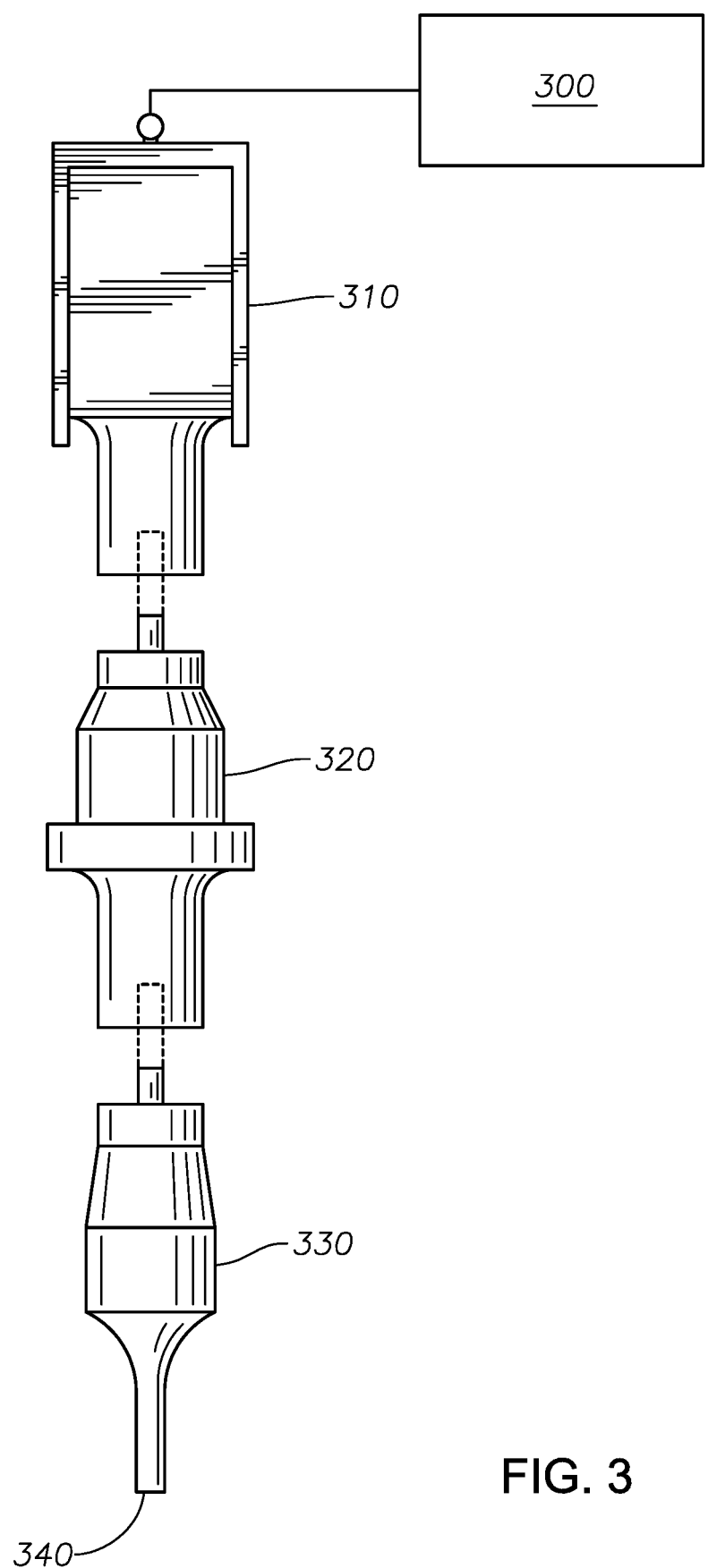
FIG. 3 illustrates an ultrasonic welding system.

According to the present application, an ultrasonic welding system is used not to welding two pieces of plastic material together, but instead to separate molded silicone hydrogel contact lens from the lens-adhered mold half. An ultrasonic welding system as illustrated in FIG. 3 comprises: a power supply 300 which provides a high power AC signal with frequency matching the resonance frequency of the ultrasonic stack. An ultrasonic stack composed of a converter 310, a booster 320 and a horn 330. All three elements of the stack are specifically tuned to resonate at the same exact ultrasonic frequency (Typically 15, 20, 30, 35, 40 or 70 kHz). The converts the electrical signal into a mechanical vibration. The booster modifies the amplitude of the vibration. The horn can also define the amplitude of vibration and apply the mechanical vibration to the parts to be contacted. However, any kind of mechanical system which transfers the vibrational energy from the converter to the mold half can be used.

Figure 4:
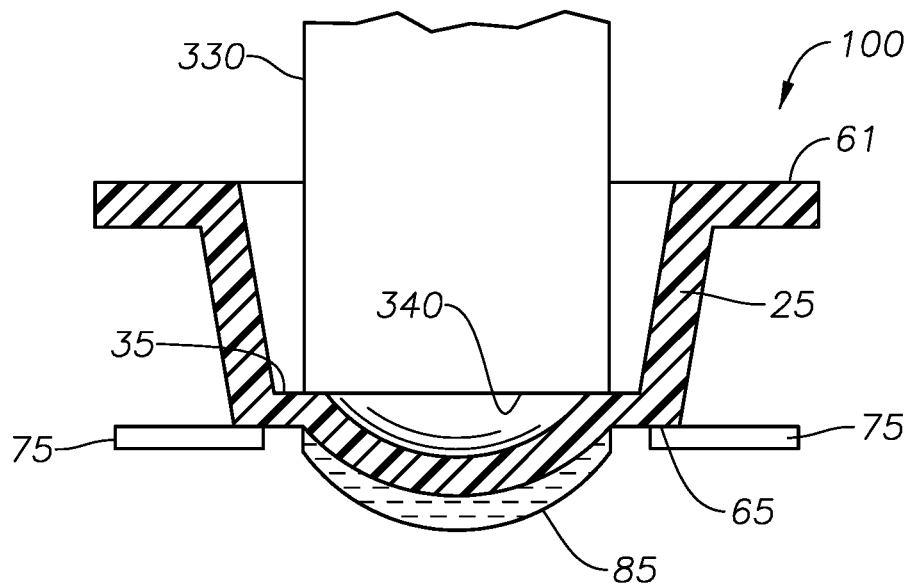
FIG. 4 illustrates a flat ultrasonic horn seated on extended flat edge surround the outer concave surface of the male mold half.

FIG. 4 illustrates an embodiment of the invention wherein an ultrasonic horn 330 having a flat surface 340 is sized to be approximately the outer diameter of the male mold half 2 and seated on extended flat edge surround the outer concave surface 35 (or back surface of the annular shoulder 65 of the male mold half. The male mold half 2 proximate the ultrasonic horn vibrates with the acoustical energy emitted from the ultrasonic horn 330 while the contact lens 85 is attached thereon so that a relative motion at the frequency of the acoustic energy takes place between back surface of the annular shoulder 65 of the male mold half and the contact lens attached thereon. The male mold half and the contact lens attached thereon is held stationary by a position holder 75. A person skilled in the art knows which device can be used as a position holder, for example, a level metal or a cup having an attached level metal. The cup can be used to collect the lens separated from the male mold half. Furthermore, the cup can be attached a vacuum source and the vacuum can assist the separation of the lens from the male mold half.

Figure 5A:
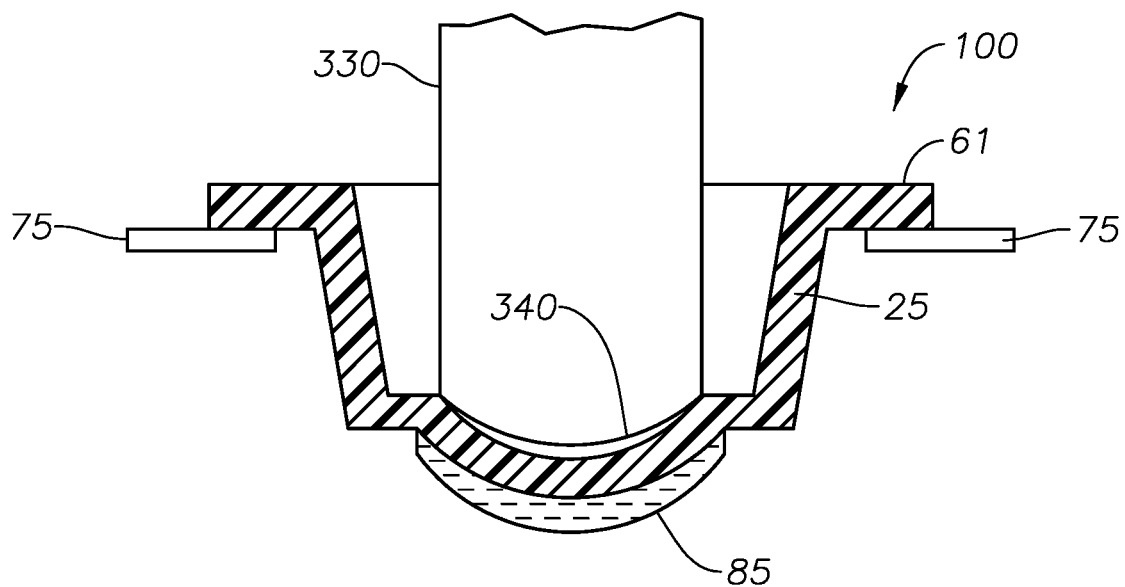
FIGS. 5A and 5B illustrate a convex ultrasonic horn is seated within the outer concave portion of male half mold half.
Figure 5B:
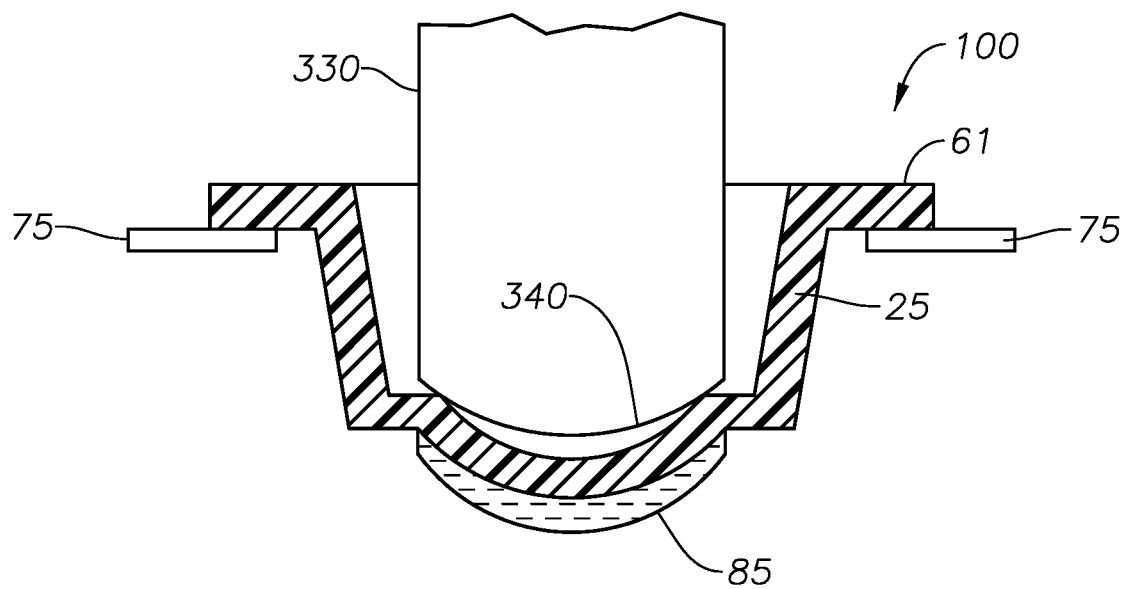

FIGS. 5A and 5B show an embodiment wherein an ultrasonic horn 330 having a convex surface 340 is of a size that allows it to extend within the outer concave portion of male half mold half 2. The male mold half and the contact lens 85 attached thereon is held stationary by a position holder 75. FIG. 5A illustrates that the ultrasonic horn vibrates with the acoustical energy emitted from the ultrasonic horn 330 while the contact lens is attached thereon so that a relative motion at the frequency of the acoustic energy takes place through contact surface between inside of the outer concave portion of male half mold half 2 and the contact lens attached thereon. FIG. 5B illustrates that the ultrasonic horn vibrates with the acoustical energy emitted from the ultrasonic horn 330 while the contact lens is attached thereon so that a relative motion at the frequency of the acoustic energy takes place through contact points between edges of the outer concave portion of male half mold half 2 and the contact lens attached thereon.

Figure 6:
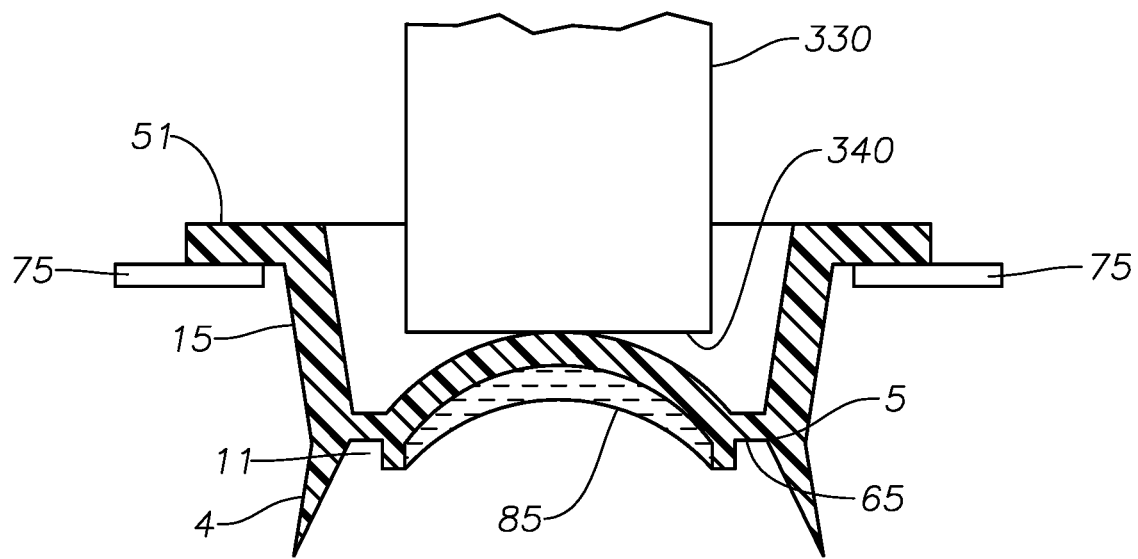
FIG. 6 illustrates a flat ultrasonic horn is sized to be approximately the outer diameter of the female mold half.

FIG. 6 illustrates an embodiment of the invention is shown wherein an ultrasonic horn 330 having a flat surface 340 is sized to be approximately the outer diameter of the female mold half 1 to contact the center area of the outer convex portion of the female mold half. The female mold half and the contact lens 85 attached thereon is held stationary by a position holder 75. The center portion of back surface (non-optical surface) of the female mold half 1 proximate the ultrasonic horn vibrates with the acoustical energy emitted from the ultrasonic horn 330 while the contact lens is attached thereon so that a relative motion at the frequency of the acoustic energy takes place between the female mold half and the contact lens attached thereon.

Figure 7A:
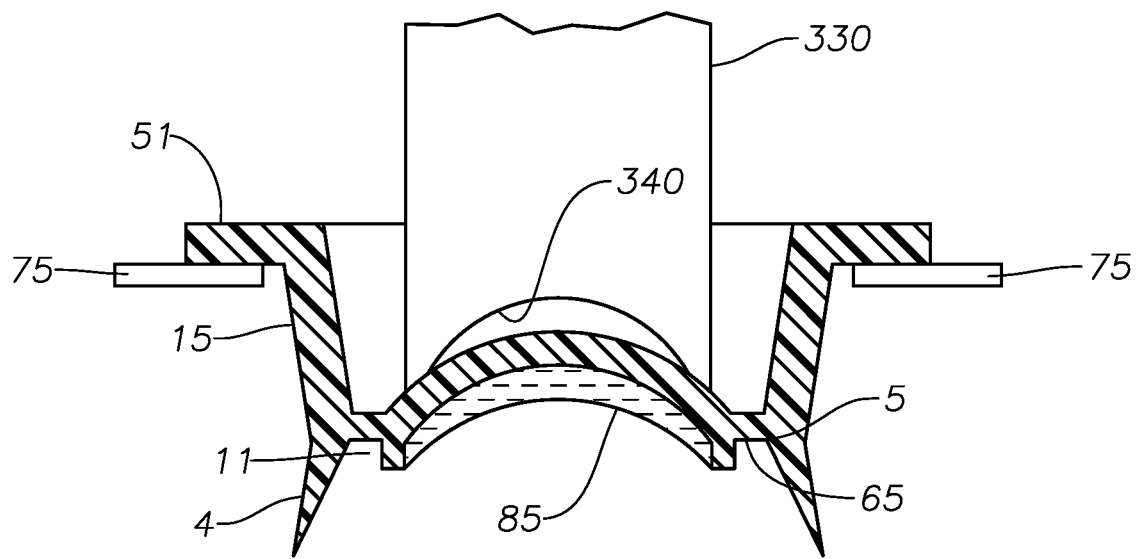
FIGS. 7A and 7B illustrate a concave ultrasonic horn seated within the outer convex portion of female half mold half.
Figure 7B:
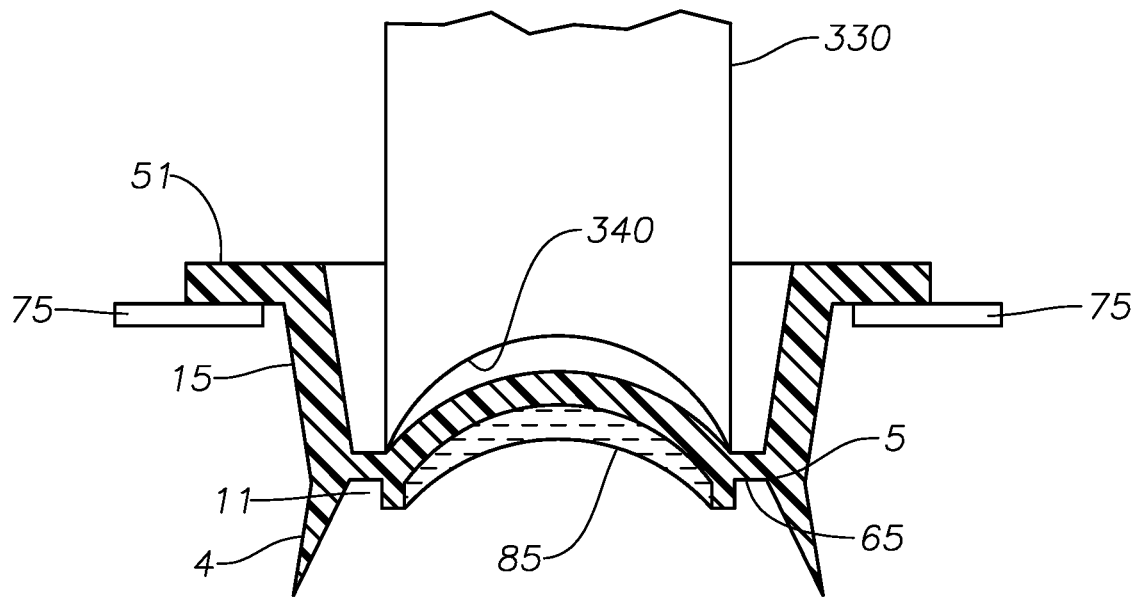

FIGS. 7A and 7B show an embodiment wherein an ultrasonic horn 330 having a concave surface 340 is of a size that allows it to extend within the outer convex portion of female half mold half 1 to contact the center area of the outer convex portion of the female mold half. The female mold half and the contact lens 85 attached thereon is held stationary by a position holder 75. FIG. 7A illustrates that the ultrasonic horn vibrates with the acoustical energy emitted from the ultrasonic horn 330 while the contact lens is attached thereon so that a relative motion at the frequency of the acoustic energy takes place through contact surface between inside of the outer convex portion of female half mold half 1 and the contact lens attached thereon. 7B illustrates that the ultrasonic horn vibrates with the acoustical energy emitted from the ultrasonic horn 330 while the contact lens is attached thereon so that a relative motion at the frequency of the acoustic energy takes place through contact points between edges of the outer concave portion of female half mold half 1 and the contact lens attached thereon.

According to the present invention, the modification to the output part of the horn and the preferred parameters associated with operating the system are given in the following.

The ultrasonic welding system is comprised of a power supply 300 which generates a frequency range from 15 kHz to 70 kHz by the use of solid state power devices. This high frequency electrical energy is supplied to a converter 320. This component changes the electrical energy into ultrasonic mechanical vibratory energy at the frequency of the converted electrical energy supply which is typically 15 kHz to 70 kHz. The vibratory ultrasonic acoustical energy is then transmitted through an amplitude modifying device called a booster 320. The booster is a passive (i.e., non-powered) device which is used to modify the output amplitude of the converter before it reaches the horn 330. The horn is shaped to have a flat surface, convex surface, a concave surface, or the like 340 which is an acoustical tool that transfers the vibratory energy directly to the non-optical surface of a mold half.

The present invention can be practiced with the above described apparatus as follows: an ultrasonic welding apparatus as described above, the specific system being used for the investigation is a Dukane iQ Series ES Servo Ultrasonic Welding Press System with a 30 kHz generator, 2:1 booster. The generator creates a user settable, high voltage (~1000 Vrms), 30 kHz signal that is applied to the transducer. The transducer expands and contract with this applied voltage and creates a mechanical vibration at the face of the transducer. This vibration is amplified by the booster and horn assembly. To maximize the effectiveness of the mechanical vibration on the part, the vibration needs to be applied in a prescribed manner.

To operate the Dukane Servo system, the ultrasonic horn is lowered to a point in space, where it begins to look for a reaction force equal to the trigger force set by the user. It will continue to move downward at prescribed speed over a short distance looking for that reaction force. When that force is achieved, the system will fire the ultrasonics. Once fired, the horn will seek to move to maintain that constant force. Force mode was chosen to deal with the normal positional variation you would encounter with different parts placed slightly differently from the previous part, as well as slight geometry variations from part to part. The generator output energy equals to the time integral of power. Example process settings are shown in the following table.

| Process Parameter | Setting |
| --- | --- |
| Generator Frequency | 30 or 40 kHz |
| Booster | 2:1 |
| Horn | 2:1 |
| Trigger Force | 100 N |
| Energy | 0.1-40J |

According to the present invention, Generator Frequency is operated between 15 kHz to 70 kHz, preferably between 20 kHz to 40 kHz, more preferably between 30 kHz to 40 kHz. Trigger Force is operated between 1.0 N to 150N, preferably between 20 N to 120N, more preferably between 40 N to 110N, still more preferably between 80 N to 100N. Energy is operated between 0.1 J to 40 J, preferably between 0.5 J to 30 J, still more preferably between 1.0 J to 20 J. The duration of applying the ultrasonic vibration energy necessary to separate the molded hydrogel contact lens from the female mold half or the male mold half attached thereon is typically less than 10 seconds, preferably less than 5.0 seconds, more preferably less than 2.0 seconds, still more preferably less than 1.0 second.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing silicone hydrogel contact lenses, comprising the steps of:
   (1) obtaining a polymerizable composition which is a clear fluid at room temperature, wherein the polymerizable composition comprises (a) at least 15% by weight of at least one hydrophilic vinylic monomer, (b) at least 15% by weight of at least one siloxane-containing polymerizable component that comprises at least one siloxane-containing vinylic monomer, at least one polysiloxane vinylic crosslinker, or a combination thereof, (c) from about 1% to about 30% by weight of at least one silicone fluid (or so-called silicone oil) which is capable of reducing mold separation force by at least 20% at room temperature compared to control formulation that comprises 1-propanol as sole non-reactive diluent and differs from the polymerizable composition only in non-reactive diluent, wherein said at least one silicone fluid is free of any ethylenically unsaturated group, does not participate in free-radical polymerization, and has a molecular weight or number-averaged molecular weight of about 2000 Daltons or less, and (d) at least one free radical initiator;
   (2) introducing the polymerizable composition into a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;
   (3) curing thermally or actinically the polymerizable composition in the lens mold to form an unprocessed SiHy contact lens;
   (4) separating the lens mold obtained in step (3) into the male and female mold halves, with the unprocessed SiHy contact lens adhered on a lens-adhered mold half which is one of the male and female mold halves;
   (5) mechanically or manually removing the unprocessed SiHy contact lens from the lens-adhered mold half before the unprocessed SiHy contact lens is contact with water or any liquid; and
   (6) subjecting the unprocessed SiHy contact lens to one or more post-molding processes selected from the group consisting of extraction, hydration, surface treatment, packaging, sterilization, and combinations thereof.

2. The method of embodiment 1, wherein the total amount of component (a) is from about 20% to about 65% by weight relative to the weight of the polymerizable composition.

3. The method of embodiment 1, wherein the total amount of component (a) is from about 25% to about 65% by weight relative to the weight of the polymerizable composition.

4. The method of embodiment 1, wherein the total amount of component (a) is from about 25% to about 60% by weight relative to the weight of the polymerizable composition.

5. The method of any one of embodiments 1 to 4, wherein the total amount of component (b) is from about 15% to about 70% by weight relative to the weight of the polymerizable composition.

6. The method of any one of embodiments 1 to 4, wherein the total amount of component (b) is from about 20% to about 65% by weight relative to the weight of the polymerizable composition.

7. The method of any one of embodiments 1 to 4, wherein the total amount of component (b) is from about 25% to about 60% by weight relative to the weight of the polymerizable composition.

8. The method of any one of embodiments 1 to 7, wherein the total amount of component (c) is from about 1% to about 26% by weight relative to the weight of the polymerizable composition.

9. The method of any one of embodiments 1 to 7, wherein the total amount of component (c) is from about 2% to about 22% by weight relative to the weight of the polymerizable composition.

10. The method of any one of embodiments 1 to 7, wherein the total amount of component (c) is from about 3% to about 18% by weight relative to the weight of the polymerizable composition.

11. The method of any one of embodiments 1 to 10, wherein said at least one silicone fluid is capable of reducing mold separation force by at least 25% at room temperature compared to control formulation that comprises 1-propanol as sole non-reactive diluent and differs from the polymerizable composition only in non-reactive diluent.

12. The method of any one of embodiments 1 to 10, wherein said at least one silicone fluid is capable of reducing mold separation force by at least 30% at room temperature compared to control formulation that comprises 1-propanol as sole non-reactive diluent and differs from the polymerizable composition only in non-reactive diluent.

13. The method of any one of embodiments 1 to 12, wherein the polymerizable composition further comprises at least one non-reactive diluent other than silicone fluid, wherein said at least one silicone fluid is present in an amount of at least 60% or 70% by weight relative to the total weight of all non-reactive diluent.

14. The method of any one of embodiments 1 to 12, wherein the polymerizable composition further comprises at least one non-reactive diluent other than silicone fluid, wherein said at least one silicone fluid is present in an amount of at least 75% or 80% by weight relative to the total weight of all non-reactive diluent.

15. The method of any one of embodiments 1 to 14, wherein the sum of the amounts of components (a) and (b) is at least about 60% by weight relative to the total weight of the polymerizable composition.

16. The method of any one of embodiments 1 to 14, wherein the sum of the amounts of components (a) and (b) is at least about 65% by weight relative to the total weight of the polymerizable composition.

17. The method of any one of embodiments 1 to 14, wherein the sum of the amounts of components (a) and (b) is at least about 70% by weight relative to the total weight of the polymerizable composition.

18. The method of any one of embodiments 1 to 14, wherein the sum of the amounts of components (a) and (b) is at least about 75% by weight relative to the total weight of the polymerizable composition.

19. The method of any one of embodiment 1 to 18, wherein said at least one silicone fluid is a fluid polymerized compound or polymer which has a number molecular weight of 2000 Daltons or less and comprises at least two siloxane units the organic substituents of which independent of one another are selected from the group consisting of $C_1$-$C_{10}$ alkyl, $C_2$-$C_{10}$ hydroxyalkyl, $C_2$-$C_{10}$ aminoalkyl, hydroxyethoxy-$C_2$-$C_6$ alkyl, and perfluoro-substituted $C_1$-$C_{10}$ alkyl.

20. The method of embodiment 19, wherein said at least one silicone fluid is selected from the group consisting of hexamethyldisiloxane, octamethyltrisiloxane, decamethyltetrasiloxane, dodecamethylpentasiloxane, tetradecamethylhexasiloxane, poly(dimethylsiloxane), hexamethylcyclotrisloxane, octamethylcyckitetrasiloxane, decamethylcyclopentasiloxane, dodecamethylcyclohexasiloxane, (3-hydroxypropyl)pentamethyldisiloxane, (3-aminopropyl)pentamethyl-disiloxane, 1,3-bis(hydroxypropyl)tetramethyldisiloxane, 1,3-bis(3-hydroxyisobutyl)tetramethyl-disiloxane, 1,3-bis(4-hydroxybutyl)tetramethyldisiloxane, 1,3-bis(3-aminopropyl)tetramethyl-disiloxane, (γ-aminopropyl)heptamethyltrisiloxane, 3-(3-hydroxypropyl)-heptamethyltrisiloxane, 3-(3-aminopropyl)heptamethyltrisiloxane, 3-[hydroxy(polyethylenoxy)-propyl]heptamethyltrisiloxane, 1,3-bis(3-hydroxypropyl)-hexamethyltrisiloxane, 1,3-bis(3-aminopropyl)hexamethyltrisiloxane, 1,3-bis[hydroxy(polyethylenoxy)-propyl]hexamethyltrisiloxane, propyltris(trimethylsiloxy)silane, hydroxypropyltris(trimethylsiloxy)silane, aminopropyl-tris(trimethylsiloxy)silane, N-methylaminopropyltris(trimethylsiloxy)silane, poly[dimethylsiloxane-co-(3-aminopropyl)methylsiloxane], poly{dimethylsiloxane-co-[3-(2-(2-hydroxyethoxy)ethoxy)-propyl]methylsiloxane}, mono-hydroxypropyl-, mono-butyl-terminated poly(dimethylsiloxane), mono-hydroxyethoxypropyl-, mono-butyl-terminated poly(dimethylsiloxane), mono-aminopropyl-, mono-butyl-terminated poly(dimethylsiloxane), α,ω-bis(hydroxypropyl)-terminated poly(dimethylsiloxane), α,ω-bis(hydroxyethoxypropyl)-terminated poly(dimethylsiloxane), α,ω-bis(aminopropyl)-terminated poly(dimethylsiloxane), poly(dimethylsiloxane-co-nonafluorohexylmethylsiloxane), and combinations thereof.

21. The method of any one of embodiment 1 to 18, wherein said at least one silicone fluid comprises hexamethyldisiloxane, octamethyltrisiloxane, decamethyltetrasiloxane, dodecamethylpentasiloxane, tetradecamethylhexasiloxane, poly(dimethylsiloxane), (3-hydroxypropyl)pentamethyldisiloxane, 1,3-bis(hydroxypropyl)tetramethyl-disiloxane, 1,3-bis(3-hydroxyisobutyl)tetramethyldisiloxane, 1,3-bis(4-hydroxybutyl)tetramethyldisiloxane, 3-(3-hydroxypropyl)-heptamethyltrisiloxane, 1,3-bis(3-hydroxypropyl)-hexamethyl-trisiloxane, mono-hydroxypropyl-, mono-butyl-terminated poly(dimethylsiloxane), mono-hydroxyethoxypropyl-, mono-butyl-terminated poly(dimethylsiloxane), α,ω-bis(hydroxypropyl)-terminated poly(dimethylsiloxane), α,ω-bis(hydroxyethoxypropyl)-terminated poly(dimethylsiloxane), or combinations thereof.

22. The method of any one of embodiments 1 to 21, wherein said at least one non-reactive diluent further comprises at least one organic solvent that has 1 to 8 carbon atoms and a boiling point of lower than 105° C. and is free of silicone.

23. The method of embodiment 22, wherein said at least one organic solvent is selected from the group consisting of methanol, ethanol, 1-propanol, isopropanol, sec-butanol, tert-butyl alcohol, tert-amyl alcohol, acetone, methyl ethyl ketone, methyl isopropyl ketone, methyl propyl ketone, ethyl acetate, heptane, methylhexane, methylcyclohexane, dimethylcyclopentane, 2,2,4-trimethylpentane, and mixtures thereof.

24. The method of embodiment 22, wherein said at least one organic solvent is selected from the group consisting of ethanol, 1-propanol, isopropanol, sec-butanol, tert-butyl alcohol, tert-amyl alcohol, and combinations thereof (or is ethanol and/or isopropanol).

25. The method of any one of embodiments 1 to 24, wherein said at least one hydrophilic vinylic monomer comprises at least one hydrophilic (meth)acrylamido monomer.

26. The method of embodiment 25, wherein said at least one hydrophilic (meth)acrylamido monomer has 3 to 8 carbon atoms.

27. The method of embodiment 25, wherein said at least one hydrophilic (meth)acrylamido monomer is selected from the group consisting of (meth)acrylamide, N-methyl (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-4-hydroxybutyl (meth)acrylamide, N,N-bis(2-hydroxyethyl) (meth)acrylamide, N-tris(hydroxymethyl) methyl (meth)acrylamide, 2-(meth)acrylamidoglycolic acid, 3-(meth)acrylamidopropionic acid, 4-(meth)acrylamido-butanoic acid, 3-(meth)acrylamido-2-methylbutanoic acid, 3-(meth)acrylamido-3-methylbutanoic acid, 2-(meth)acrylamido-2-methyl-3,3-dimethyl butanoic acid, 5-(meth)acrylamidopentanoic acid, 3-(meth)acrylamidohaxanoic acid, 4-(meth)acrylamido-3,3-dimethylhexanoic acid, (3-(meth)acrylamidophenyl) boronic acid, 3-((3-methacrylamidopropyl) dimethylammonio)-propane-1-sulfonate; 3-((3-acrylamidopropyl)dimethylammonio)propane-1-sulfonate, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, poly(ethylene glycol)ethyl (meth)acrylamide having a number average molecular weight of up to 700, methoxy-poly(ethylene glycol)ethyl (meth)acrylamide having a number average molecular weight of up to 700, and combinations thereof.

28. The method of any one of embodiments 25 to 27, wherein said at least one hydrophilic (meth)acrylamido monomer comprises N,N-dimethyl (meth)acrylamide, N-ethyl (meth)acrylamide, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, (meth)acrylamide, N-(2-aminoethyl)(meth)acrylamide, N-(3-aminopropyl)(meth)acrylamide, or combinations thereof.
29. The method of any one of embodiments 25 to 27, wherein said at least one hydrophilic (meth)acrylamido monomer comprises N,N-dimethyl (meth)acrylamide, N-2-hydroxyethyl (meth)acrylamide, or a combination thereof.
30. The method of any one of embodiments 1 to 29, wherein said at least one hydrophilic vinylic monomer comprises at least one hydrophilic (meth)acryloxy monomer.
31. The method of embodiment 30, wherein said at least one hydrophilic (meth)acryloxy monomer is selected from the group consisting of 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, polyethylene glycol) (meth)acrylate having a number average molecular weight of up to 1500, (meth)acrylic acid, ethylacrylic acid, propylacrylic acid, butylacrylic acid, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly (ethylene glycol) (meth)acrylate having a number average molecular weight of up to 1500, and combinations thereof.
32. The method of any one of embodiments 1 to 31, wherein said at least one hydrophilic vinylic monomer comprises at least one hydrophilic N-vinyl amide monomer selected from the group consisting of N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof.
33. The method of any one of embodiments 1 to 32, wherein said at least one hydrophilic vinylic monomer comprises: (a) at least one methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (b) at least one vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, polyethylene glycol) methyl vinyl ether, and combinations thereof; (c) at least one allyl ether monomer selected from the group consisting of ethylene glycol monoallyl ether, di(ethylene glycol) monoallyl ether, tri(ethylene glycol) monoallyl ether, tetra(ethylene glycol) monoallyl ether, polyethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (d) at least one phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]-ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)-ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)-ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)-pentyl-2'-(trimethylammonio) ethylphosphate, 2-((meth)acryloyloxy)hexyl-2'-(trimethylammonio)ethyl phosphate, 2-(vinyloxy)ethyl-2'-(trimethylammonio)-ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)-ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (e) allyl alcohol; (f) N-2-hydroxyethyl vinyl carbamate; (g) N-vinyloxycarbonyl-β-alanine (VINAL); (h) N-vinyloxycarbonyl-α-alanine; or (i) combinations thereof.
34. The method of any one of embodiments 1 to 33, wherein the component (b) comprises at least one siloxane-containing (meth)acrylamido monomer containing a tris(trialkylsiloxy)silyl group.
35. The method of embodiment 34, wherein said at least one siloxane-containing (meth)acrylamido monomer containing a tris(trialkylsiloxy)silyl group is selected from the group consisting of N-[tris(trimethylsiloxy)

silylpropyl] (meth)acrylamide, N-[tris(dimethylethylsiloxy)-silylpropyl] (meth)acrylamide, N-[tris(dimethylpropylsiloxy)silylpropyl] (meth)acrylamide, N-[tris(dimethylphenylsiloxy)silylpropyl] (meth)acrylamide, N-(2-hydroxy-3-(3-(tris(trimethylsilyloxy)silyl)propyloxy)propyl)-2-methyl (meth)acrylamide, N-(2-hydroxy-3-(3-(tris(trimethylsilyloxy)silyl)propyloxy)propyl) (meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyl)propyloxy)propyl] (meth)acrylamide, and combinations thereof.

36. The method of any one of embodiments 1 to 35, wherein the component (b) comprises at least one siloxane-containing (meth)acrylamido monomer containing a bis(trialkylsilyloxy)-alkylsilyl group.

37. The method of embodiment 36, wherein said at least one siloxane-containing (meth)acrylamido monomer containing a bis(trialkylsilyloxy)alkylsilyl group is selected from the group consisting of N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)-propyl] (meth)acrylamide, N-[2-hydroxy-3-(3-(t-butyldimethylsilyl)propyloxy)propyl]-2-methyl acrylamide, a siloxane-containing (meth)acrylamido monomer of one of formula (Ia) to (Ih), and combinations thereof,

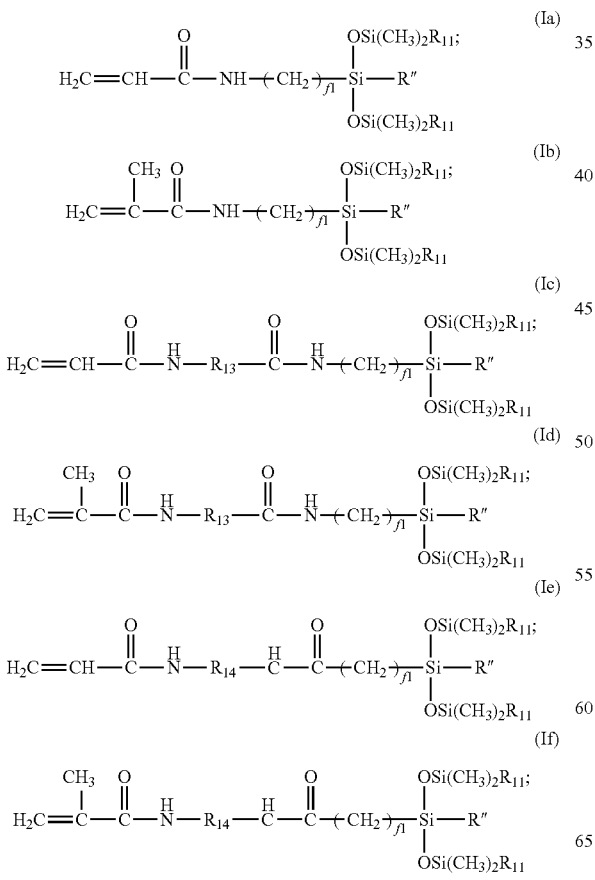

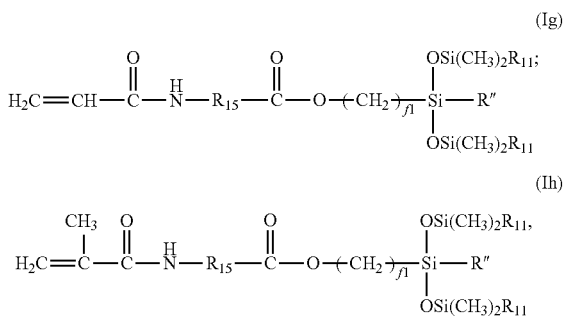

in which $R_{13}$ is a divalent alkylene radical of

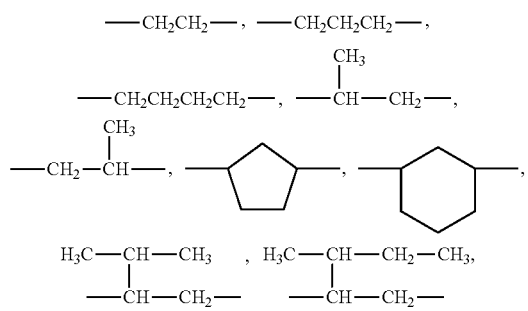

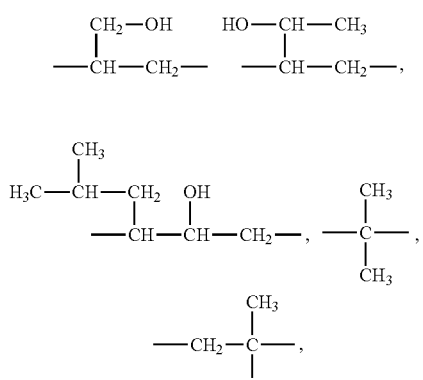

$R_{14}$ is a divalent alkylene radical of —$CH_2CH_2$— or —$CH_2CH_2CH_2$—, and $R_{15}$ is a divalent alkylene radical of

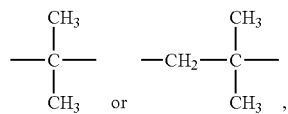

R″ and $R_{11}$ independent of each other is $C_1$-$C_4$ alkyl, and f1 is an integer of from 3 to 5.

38. The method of any one of embodiments 1 to 37, wherein the component (b) comprises at least one mono-(meth)acrylamido-terminated oligo- or polysiloxane of formula (IIa)

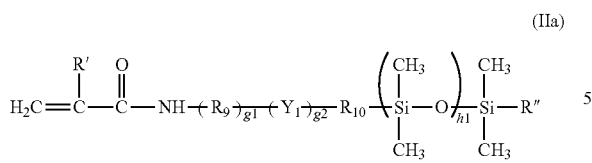

(IIa)

in which R' is hydrogen or methyl, R" independent of each other is $C_1$-$C_6$ alkyl, g1 and g2 independent of each other are integer of 0 or 1, h1 is an integer of 2 to 25, $R_9$ and $R_{10}$ independent of each other are a substituted or unsubstituted $C_1$-$C_{10}$ alkylene divalent radical, $Y_1$ is a linkage of

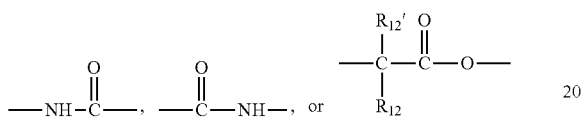

in which $R_{12}$ and $R_{12}'$ independent of each other are $C_1$-$C_6$ alkyl.

39. The method of embodiment 38, wherein in formula (IIa) h1 is an integer of 3 to 20 (more preferably 3 to 15).

40. The method of embodiment 38 or 39, wherein in formula (IIa) $R_{12}$ and $R_{12}'$ independent of each other are methyl.

41. The method of any one of embodiments 38 to 40, wherein at least one mono-(meth)acrylamido-terminated oligo- or polysiloxane is selected from the group consisting of α-(meth)acryloyl-amidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxy-propyl]-terminated ω-$C_1$-$C_4$-alkyl terminated polydimethylsiloxane, α-[3-(meth)acrylamido-isopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl]terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethyl-butylsilane) (meth)acrylamide, (meth)acryloylamidopropyltetra(dimethylsiloxy)-dimethylbutylsilane, and combinations thereof.

42. The method of any one of embodiments 1 to 41, wherein the component (b) comprises at least one polysiloxane vinylic crosslinker selected from the group consisting of: an α,ω-(meth)acryloxy-terminated polydimethylsiloxane; an α,ω-(meth)acrylamido-terminated polydimethylsiloxane; an α,ω-vinyl carbonate-terminated polydimethylsiloxane; an α,ω-vinyl carbamate-terminated polydimethylsiloxane; a bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane of various molecular weight; a reaction product of glycidyl methacrylate with a di-amino-functionalized polydimethylsiloxane; a reaction product of an azlactone-containing vinylic monomer with a d-hydroxyl-functionalized polydimethylsiloxane; and combinations thereof.

43. The method of any one of embodiments 1 to 41, the component (b) comprises at least one polysiloxane vinylic crosslinker of formula (H)

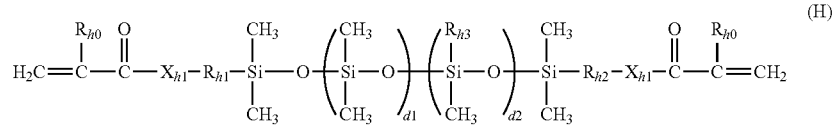

in which:
d1 is an integer of from 30 to 500 and d2 is an integer of from 1 to 75, provided that d2/d1 is from about 0.035 to about 0.15 (preferably from about 0.040 to about 0.12, even more preferably from about 0.045 to about 0.10);

$X_{h1}$ is O or $NR_{hN}$ in which $R_{hN}$ is hydrogen or $C_1$-$C_{10}$-alkyl;

$R_{h0}$ is hydrogen or methyl;

$R_{h1}$ and $R_{h2}$ independently of each other are a substituted or unsubstituted alkylene divalent radical or a divalent radical of —$R_{h4}$—O—$R_{h5}$— in which $R_{h4}$ and $R_{h5}$ independently of each other are a substituted or unsubstituted alkylene divalent radical;

$R_{h3}$ is a monovalent radical of any one of formula (H-a) to (H-e)

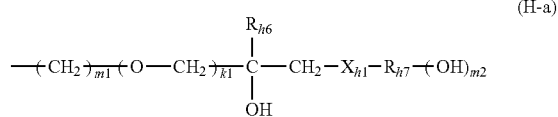

(H-a)

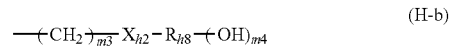

(H-b)

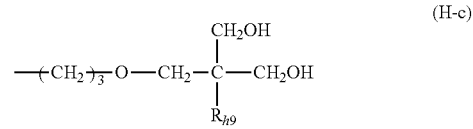

(H-c)

-continued

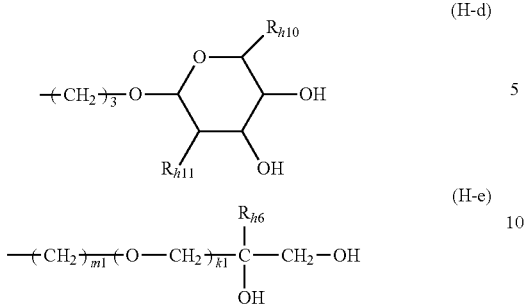

k1 is zero or 1; m1 is an integer of 2 to 4; m2 is an integer of 1 to 5; m3 is an integer of 3 to 6; m4 is an integer of 2 to 5;

$R_{h6}$ is hydrogen or methyl;

$R_{h7}$ is a $C_2$-$C_6$ hydrocarbon radical having (m2+1) valencies;

$R_{h8}$ is a $C_2$-$C_6$ hydrocarbon radical having (m4+1) valencies;

$R_{h9}$ is ethyl or hydroxymethyl;

$R_{h10}$ is methyl or hydromethyl;

$R_{h11}$ is hydroxyl or methoxy;

$X_{h1}$ is a sulfur linkage of —S— or a teriary amino linkage of —$NR_{h12}$— in which $R_{h12}$ is $C_1$-$C_1$ alkyl, hydroxyethyl, hydroxypropyl, or 2,3-dihydroxypropyl; and $X_{h2}$ is a linkage of

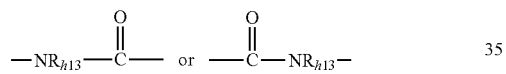

in which $R_{h13}$ is hydrogen or $C_1$-$C_{10}$ alkyl.

44. The method of any one of embodiments 1 to 41, wherein the component (b) comprises (i) at least one polysiloxane vinylic crosslinker having one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (ii) at least one chain-extended polysiloxane vinylic crosslinker having at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

45. The method of any one of embodiments 1 to 41, wherein the component (b) comprises (i) at least one polysiloxane vinylic crosslinker selected from the group consisting of α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxy-ethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-iso-propyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, and combinations thereof.

46. The method of any one of embodiments 1 to 41, wherein the component (b) comprises at least one polysiloxane vinylic crosslinker having a polymer chain segment (i.e., a divalent radical) of

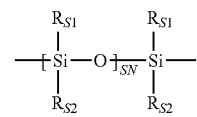

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—$OR^\circ$ (in which alk is $C_1$-$C_6$ alkylene diradical, $R^\circ$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, or a linear hydrophilic polymer chain, in which $R_{N1}$ and $R_{N1}'$ independent of each other are hydrogen or a $C_1$-$C_{15}$ alkyl.

47. The method of any one of embodiments 1 to 41, wherein the component (b) comprises at least one polysiloxane vinylic crosslinker of formula (1) or (2)

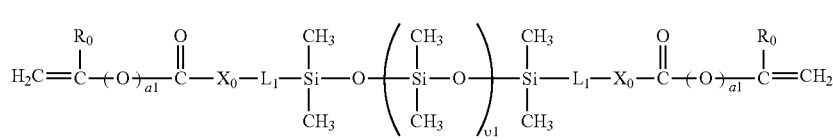
(1)

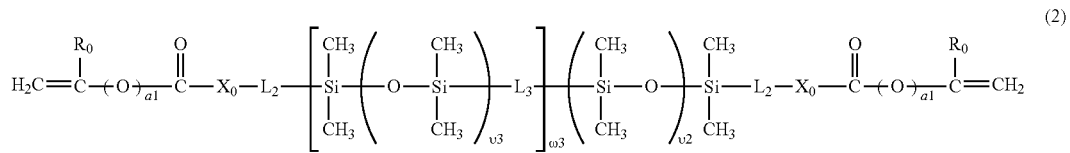
(2)

in which:

$R_o$ is H or methyl;

v1 is an integer of from 30 to 500; v2 and v3 independent of each other are an integer of from 5 to 100; ω2 and ω3 independent of each other are an integer of from 1 to 15;

a1 and g1 independent of each other is zero or 1;

$L_1$ is a $C_2$-$C_8$ alkylene divalent radical or a divalent radical of

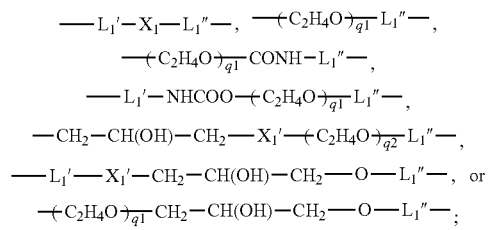

$L_1'$ is a $C_2$-$C_5$ alkylene divalent radical which has zero or one hydroxyl group;

$L_1''$ is $C_3$-$C_8$ alkylene divalent radical which has zero or one hydroxyl group;

$L_2$ is a divalent radical of

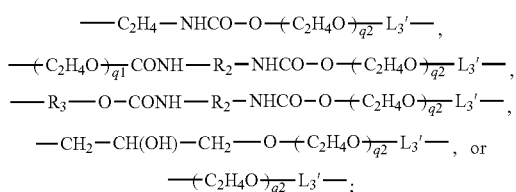

$L_3$ is a divalent radical of

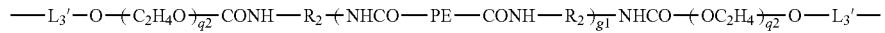

in which PE is

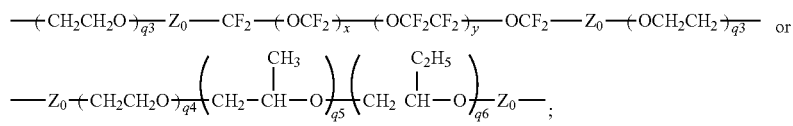

$L_3'$ is $C_3$-$C_8$ alkylene divalent radical;

$R_2$ is a $C_4$-$C_{14}$ hydrocarbon divalent radical;

$R_3$ is a $C_2$-$C_6$ alkylene divalent radical;

$X_0$, $X_1'$, and $X_{o1}$ independent of one another are O or $NR_1$;

$X_1$ is O, $NR_1$, NHCOO, OCONH, $CONR_1$, or $NR_1CO$;

$Z_0$ is a direct bond or a $C_1$-$C_{12}$ alkylene divalent radical.

48. The method of any one of embodiments 1 to 47, wherein the component (b) comprises at least one siloxane-containing vinylic monomer of formula (M1) or (M2):

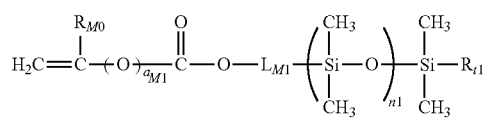
(M1)

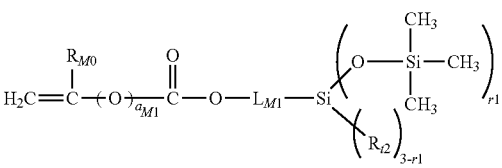
(M2)

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of

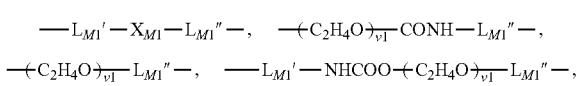

-continued

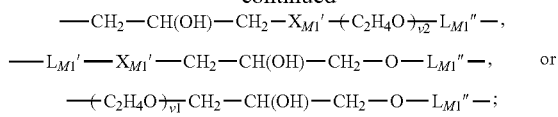

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{r1}$ and $R_{r2}$ independent of each other are a $C_1$-$C_6$ alkyl; $X_{M1}'$ is O or $NR_1$; v1 is an integer of 1 to 30; m2 is an integer of 0 to 30; n1 is an integer of 3 to 40; and r1 is an integer of 2 or 3.

49. The method of embodiment 48, wherein said at least one siloxane-containing vinylic monomer comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)propyloxy)propylbis(trimethylsiloxy)methylsilane, 3-(meth)acryloxy-2-hydroxypropyloxy)propyltris(trimethylsiloxy) silane, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyltris(trimethylsiloxy)silane, 3-[tris (trimethylsiloxy)silyl]-propylvinyl carbamate, 3-[tris (trimethylsiloxy)silyl] propyl allyl carbamate, 3-[tris (trimethylsiloxy)silyl]propyl vinyl carbonate, or a combination thereof.

50. The method of any one of embodiments 1 to 47, wherein wherein the component (b) comprises at least one siloxane-containing vinylic monomer selected from the group consisting of α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth) acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth) acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth) acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

51. The method of any one of embodiments 1 to 50, wherein the polymerizable composition further comprises at least one non-silicone hydrophobic vinylic monomer.

52. The method of any one of embodiments 1 to 50, wherein the polymerizable composition further comprises at least one $C_1$-$C_8$ alkyl (meth)acrylate, at least one $C_5$-$C_{16}$ cycloalkyl (meth)acrylate, at least one aryl methacrylate, (meth)acrylonitrile, at least one fluorine-containing acrylic monomer, at least one vinyl alkanoate, at least one vinyloxyalkane, at least one substituted or unsubstituted styrene, vinyl toluene, vinyl chloride, vinylidene chloride, 1-butene, or combinations thereof.

53. The method of embodiment 52, wherein said at least one vinyl alkanoate is selected from the group consisting of vinyl acetate, vinyl propionate, vinyl butyrate, vinyl valerate, and combinations thereof, wherein said at least one vinyloxyalkane is selected from the group consisting of vinyl ethyl ether, propyl vinyl ether, n-butyl vinyl ether, isoputyl vinyl ether, cyclohexyl vinyl ether, t-butyl vinyl ether, and combinations thereof, wherein said at least one fluorine-containing acrylic monomer is selected from the group consisting of 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, perfluorohexylethyl-thio-carbonyl-aminoethyl-methacrylate, and combinations thereof.

54. The method of any one of embodiments 1 to 50, wherein the polymerizable composition further comprises methyl methacrylate, ethyl methacrylate, isopropyl methacrylate, sec-butyl methacrylate, tert-butyl methacrylate, cyclohexyl methacrylate, isobornyl acrylate, isobornyl methacrylate, phenyl methacrylate, 4-tert-butylstyrene, 2-methylstyrene, styrene, 4-ethoxystyrene, 2,4-dimethystyrene, 2,5-dimethylstyrene, 3,5-dimethylstyrene, or combinations thereof.

55. The method of any one of embodiments 1 to 50, wherein the polymerizable composition further comprises methyl methacrylate, tert-butyl methacrylate, cyclohexyl methacrylate, isobornyl acrylate, isobornyl methacrylate, or combinations thereof.

56. The method of any one of embodiments 1 to 50, wherein the polymerizable composition further comprises methyl methacrylate, tert-butyl methacrylate, cyclohexyl methacrylate, or combinations thereof.

57. The method of any one of embodiments 1 to 56, wherein the polymerizable composition further comprises at least one non-silicone vinylic crosslinker.

58. The method of any one of embodiments 1 to 56, wherein the polymerizable composition further comprises at least one non-silicone vinylic crosslinker selected from the group consisting of ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di- (meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl]phosphate, trimethylolpropane di-(meth)acrylate, and 3,4-bis[(meth)acryloyl] tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis (meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamide-propane-2-yl dihydrogen phosphate (i.e., N,N'-2-phophonyloxypropylene bis(meth)acrylamide), piperazine diacrylamide (or 1,4-bis(meth)acryloyl piperazine), tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, and combinations thereof.

59. The method of any one of embodiments 1 to 56, wherein the polymerizable composition further comprises from about 1.5% or less by weight of the non-silicone vinylic crosslinker relative to the total weight of all polymerizable components in the polymerizable composition, wherein the non-silicone vinylic crosslinker is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, or a combination thereof.

60. The method of any one of embodiments 1 to 59, wherein the polymerizable composition further comprises at least one UV-absorbing vinylic monomer and/or at least one UV/HEVL-Absorbing vinylic monomer.

61. The method of any one of embodiments 1 to 59, wherein the polymerizable composition comprises 2-[2'-hydroxy-5'-(2-methacryloxyethyl)phenyl)]-2H-benzotriazole (Norbloc).

62. The method of any one of embodiments 1 to 61, wherein the polymerizable composition further comprises at least one photochromic vinylic monomer.

63. The method of any one of embodiments 1 to 61, wherein the polymerizable composition further comprises at least one photochromic vinylic monomer selected from the group consisting of polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline)pyridobenzoxazines, polymerizable spiro(benzindoline)pyridobenzoxazines, polymerizable spiro (benzindoline)naphthoxazines, polymerizable spiro(indoline)-benzoxazines, polymerizable diarylethenes, and combinations thereof.

64. The method of any one of embodiments 1 to 63, wherein step of curing is performed actinically with a UV or visible light.

65. The method of any one of embodiments 1 to 63, wherein step of curing is performed actinically with a visible light in a region of from 420 nm to 500 nm, wherein said at least one free radical initiator comprises a benzoylphosphine initiator and/or an acylgermanium photoinitiator.

66. The method of any one of embodiments 1 to 63, wherein said at least one free radical initiator comprises a thermal polymerization initiator, wherein the step of curing is carried out thermally in an oven at one or more curing temperatures of from about 45° C. to about 100° C. under a nitrogen environment for at least 45 minutes to form an unprocessed silicone hydrogel lens contact lens, wherein the nitrogen environment in the oven is maintained by flowing nitrogen gas through the oven at a first flow rate.

67. The method of embodiment 66, wherein the polymerizable composition in the lens mold in the oven is cured for at least about 60 minutes.

68. The method of embodiment 66, wherein the polymerizable composition in the lens mold in the oven is cured for at least about 90 minutes.

69. The method of embodiment 66, wherein the polymerizable composition in the lens mold in the oven is cured for at least about 120 minutes.

70. The method of any one of embodiments 66 to 69, further comprising a post-curing treatment process between steps (3) and (4).

71. The method of embodiment 70, wherein the post-curing treatment process comprises the steps of: raising oven temperature to a post-curing temperature of about 110° C. or higher while increasing the flow rate of nitrogen gas through the oven to a second flow rate which is at least about 2.0 folds of the first flow rate; and heating the lens mold with the unprocessed silicone hydrogel contact lens therewithin in the oven at the post-curing temperature under nitrogen gas flow through the oven at the second flow rate for at least about 30 minutes.

72. The method of embodiment 71, wherein the post-curing temperature is at least about 110° C.

73. The method of embodiment 71, wherein the post-curing temperature is at least about 115° C.

74. The method of embodiment 71, wherein the post-curing temperature is at least about 120° C.

75. The method of any one of embodiments 71 to 74, wherein the second flow rate is at least about 2.0 folds of the first flow rate.

76. The method of any one of embodiments 71 to 74, wherein the second flow rate is at least about 3.0 folds of the first flow rate.

77. The method of any one of embodiments 71 to 74, wherein the second flow rate is at least about 4.0 folds of the first flow rate.

78. The method of any one of embodiments 71 to 77, wherein the lens mold with the unprocessed silicone hydrogel contact lens therewithin is heated in the oven at the post-curing temperature for at least 60 minutes.

79. The method of any one of embodiments 71 to 77, wherein the lens mold with the unprocessed silicone hydrogel contact lens therewithin is heated in the oven at the post-curing temperature for at least 90 minutes.

80. The method of any one of embodiments 71 to 77, wherein the lens mold with the unprocessed silicone hydrogel contact lens therewithin is heated in the oven at the post-curing temperature for at least 120 minutes.

81. The method of any one of embodiments 1 to 80, wherein the step (5) of removing is performed, before the unprocessed silicone hydrogel contact lens is contact with water or any liquid, by (a) bring a ultrasonic horn in direct contact with at least one area of a non-optical surface of the lens-adhered mold half having the unprocessed silicone hydrogel lens precursor attached thereon and (b) applying a ultrasonic vibrational energy of from about 0.2 to about 18 J to the at least one area of the non-optical surface of the lens-adhered mold half having the unprocessed silicone hydrogel contact lens adhered thereon so as to remove the unprocessed silicone hydrogel contact lens from the lens-adhered mold half.

82. The method of embodiment 81, wherein the ultrasonic horn has a convex surface which is in contact with the lens-adhered mold half.

83. The method of embodiment 81, wherein the ultrasonic horn has a concave surface which is in contact with the lens-adhered mold half.

84. The method of embodiment 81, wherein the ultrasonic horn has a flat surface which is in contact with the lens-adhered mold half.

85. The method of any one of embodiments 81 to 84, further comprising a step of subjecting the unprocessed silicone hydrogel contact lens obtained in step (5) to one or more post-molding processes selected from the group consisting of extraction, hydration, surface treatment, packaging, sterilization, and combinations thereof.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

The apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1 (herein incorporated by reference in its entirety).

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Mold Separating Force

The mold separating force (i.e., force for separating lens molds each with a molded unprocessed SiHy contact lens therein (i.e., hereinafter "subassembly" or "subassemblies") is measured with a testing machine (Zwick Roell, Model No. BZ2.5/TNIS). The measurements of subassemblies (closed molds each with a molded unprocessed SiHy lens) are carried out after curing and cooling to room temperature (RT). One subassembly is placed in the fixture each time with the base curve facing up. The system begins to run and slowly starts opening the molds (speed of opening 50 mm/min). The maximum force measured is the mold separation force it takes to open the mold completely. Ten to twenty subassemblies are measured for each formulation. The averaged mold separation is obtained by averaging the measured values of mold separation force for each SiHy lens formulation (i.e., a polymerizable composition for making SiHy contact lenses). In this application, the term "mold separation force" refers to the averaged mold separation force obtained averaging the values (i.e., 10 to 20 values) of mold separation force measured for each SiHy lens formulation (i.e., a polymerizable composition for making SiHy contact lenses).

Example 2

Preparation of Polymerizable Compositions

All polymerizable compositions (i.e., "formulations") are prepared at room temperature in air by blending all the components listed in Table 1 excluding Vazo-64 for 30-120 minutes using a magnetic stir plate. Then above mixture is cooled down in ice bath for 10 min, added thermal initiator Vazo-64 (2,2'-dimethyl-2,2'azodipropiononitrile) and blended for 30 min. CE-PDMS (Mn 12.0 KD) represents a polysiloxane vinylic crosslinker which has three polydimethylsiloxane (PDMS) segments linked via diurethane linkages between two PDMS segments and two urethane linkages each located between one terminal methacrylate group and one PDMS segment and is prepared according to method similar to what described in Example 2 of U.S. Pat. No. 8,529,057; TrisAm represents (N-[tris(trimethylsiloxy)-silylpropyl]acrylamide); DMA represents N,N-dimethylacrylamide; Vazo-64 represents 2,2'-dimethyl-2,2'azodipropiononitrile; Norbloc is 2-[2'-hydroxy-5'-(2-methacryloxyethyl)phenyl)]-2H-benzotriazole from Aldrich; RB247 is Reactive Blue 247; UV28 represents 2-{2'-Hydroxy-3'-tert-butyl-5'-[3'-methacryloyloxy-propoxy]phenyl}-5-chloro-2H-benzotriazole; PrOH represents n-propanol; and OM-Tris is octamethyltrisiloxane from Sigma Aldrich.

TABLE 1

| | Lens Formulation (weight unit parts) | | | | | |
|---|---|---|---|---|---|---|
| CHEMICAL | 2-1 (Control) | 2-2 | 2-3 | 2-4 | 2-5 | 2-6 |
| PrOH | 10 | 5 | 3 | 0 | 5 | 0 |
| OM-Tris | 0 | 5 | 7 | 10 | 10 | 15 |
| DMA | 33 | 33 | 33 | 33 | 33 | 33 |
| NORBLOC | 1.50 | 1.50 | 1.50 | 1.50 | 1.50 | 1.50 |
| UV28 | 0.40 | 0.40 | 0.40 | 0.40 | 0.40 | 0.40 |
| RB247 | 0.01 | 0.01 | 0.01 | 0.01 | 0.01 | 0.01 |
| TRIS-Am | 28 | 28 | 28 | 28 | 28 | 28 |
| CE-PDMS | 40 | 40 | 40 | 40 | 40 | 40 |
| Vazo-64 | 0.50 | 0.50 | 0.50 | 0.50 | 0.50 | 0.50 |
| TOTAL = | 113.41 | 113.41 | 113.41 | 113.41 | 118.41 | 118.41 |

Cast Molding Including Curing and Post-Curing Treatment

A lens formulation is purged with nitrogen at room temperature for 30 to 35 minutes. The $N_2$-purged lens formulation is introduced into polypropylene molds and the molds are closed and placed in an oven. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The polymerizable compositions in the molds are thermally cured in the oven under the following conditions: (1) purging the oven for about 30 minutes by flowing nitrogen through the oven at a flow rate (e.g., 60 cubic foot per hour); (2) ramping from room temperature to a first curing temperature (e.g., 55° C.) and then holding at the first curing temperature for a first curing time period (about 40 minutes) while keeping nitrogen flow at a flow rate (e.g., 40 cubic foot per hour); (3) ramping from the first curing temperature to a second curing temperature (e.g., 80° C.) and holding at the second curing temperature for a second curing time period (e.g., about 40 minutes) while keeping nitrogen flow at a flow rate (e.g., about 40 cubic foot per hour); (4) ramping from the second curing temperature to a third curing temperature (e.g., 100° C.) and holding at the third curing temperature for a third curing time period (e.g., about 40 minutes) while keeping nitrogen flow at the $2^{nd}$ flow rate; and (5) cooling from the post-curing temperature to room temperature before opening the oven and removing the molds from the oven.

Cooling Treatment

Lens mold or mold half with a molded or adhered silicone hydrogel contact lens precursor thereon, is placed under a cold air gun (from Vortec, model No. 610) with −33° C. cold air flow for 5 seconds, then to be demolded or delensed immediately.

Mold Separation—Demolding

Lens molds each with a molded silicone hydrogel contact lens precursor therein are mechanically opened as illustrated by FIG. 2 and described above, with or without pre cooling treatment. The molded unprocessed silicone hydrogel contact lens precursors adhere to the male or female mold halves. The results of demold yields are reported in Table 2.

TABLE 2

| | Lens Formulation # | | | | | |
|---|---|---|---|---|---|---|
| Testing | 2-1 (Control) | 2-2 | 2-3 | 2-4 | 2-5 | 2-6 |
| Mold Separation Force (N) | 95 ± 6 | 89 ± 5 | 84 ± 6 | 57 ± 4 | 75 ± 6 | 56 ± 5 |
| Demold Yield at RT | <30% | <30% | ~90% | >95% | >95% | >95% |
| Demold Yield after cooling | ~80% | ~90% | — | — | — | — |
| Delens Yield (BC, RD) | <5% | ~15% | ~20% | >95% | ~10% | >95% |
| Delens Yield (FC, RT) | <5% | <5% | ~10% | >95% | <5% | >95% |
| Delens Yield (BC, cooling) | 75% | >95% | >95% | — | >95% | — |
| Delens Yield (FC, cooling) | <5% | >95% | >95% | — | >95% | — |

Table 2 shows that the silicone fluid, octamethyltrisiloxane, can reduce average mold separation force (i.e., mold separation force) by about $$40\% \left( \frac{95 - 57}{95} \times 100\% = 40\% \right)$$

or about $$41\% \left( \frac{95 - 56}{95} \times 100\% = 41\% \right),$$

compared to use of 1-propanol as non-reactive diluent at room temperature.

Delensing—Removing Lens Precursors from Lens-Adhered Mold Halves

Molded unprocessed silicone hydrogel contact lenses are removed (i.e., "delensed") from lens-adhered male mold halves by using an ultrasonic welding apparatus as illustrated in FIG. 3, with or without pre cooling treatment. An ultrasonic horn made of stainless steel and having a shape shown in FIGS. 4 and 5. The ultrasonic vibration energy used in delensing is about 8 J. The trigger force is about 100 N. Lenses adhered female mold halves are removed manually by using an Arbor Press (ANESVILLE TOOL & MFG Inc., Model ILP-500) with or without pre cooling treatment. The results of delensing yield are reported in Table 2.

The silicone hydrogel contact lenses removed from lens-adhered mold halves are subjected to extraction (with 1-propanol), hydration, packaged in phosphate-buffered saline (pH around 7.2) in a polypropylene package, and autoclaved at about 120° C. for 45 minutes. The oxygen permeability, equilibrium water content, and elastic modulus of the obtained silicone hydrogel contact lenses are determined and reported in Table 3.

TABLE 3

| Lens Formulation | Modulus | DK | Water Content |
|---|---|---|---|
| 2-1 (control) | 0.68-0.72 | 120-125 | 32-33% |
| 2-4 | 0.68-0.70 | 122-124 | 32-33% |

Example 3

Preparation of Polymerizable Compositions

All polymerizable compositions (i.e., "formulations") in Table 4 are prepared in the same approach as described in Example 2. HM-BiS represents hexamethyldisiloxane from Sigma Aldrich, and DM-TetS represents decamethyltetrasiloxane from Sigma Aldrich.

Lens cast molding, curing, and post-curing treatment are the same as descript in Example 2. Demold and delens process are the same as described in Example 2.

Table 4 shows that each of the 3 silicone fluids (heaxamethyldisiloxane, octamethyltrisiloxane, and decamethyltetrasiloxane) under test can reduce average mold separation force (i.e., mold separation force) by about $$40\% \left( \frac{95-57}{95} \times 100\% = 40\% \right)$$

or about $$41\% \left( \frac{95-56}{95} \times 100\% = 41\% \right),$$

compared to use of 1-propanol as non-reactive diluent at room temperature.

TABLE 4

| | Lens Formulation (weight unit parts) | | | |
|---|---|---|---|---|
| Diluent | 3-1 (control) PrOH | 3-2 HM-BiS | 3-3 OM-TriS | 3-4 DM-TetS |
| DMA | 10 | 10 | 10 | 10 |
| | 33 | 33 | 33 | 33 |
| RB247 | 0.01 | 0.01 | 0.01 | 0.01 |
| TRIS-Am | 28 | 28 | 28 | 28 |
| CE-PDMS | 40 | 40 | 40 | 40 |
| Vazo-64 | 0.50 | 0.50 | 0.50 | 0.50 |
| TOTAL = | 111.51 | 111.51 | 111.51 | 111.51 |
| Mold Separation Force (N) | 95 ± 6 | 56 ± 5 | 57 ± 4 | 57 ± 5 |
| Demold Yield at RT* | <30% | >95% | >95% | >95% |
| Demold Yield after cooling* | ~80% | — | — | — |
| Delens Yield (BC, RT) | <5% | >95% | >95% | >95% |
| Delens Yield (FC, RT) | <5% | >95% | >95% | >95% |

Preparation of Polymerizable Compositions

All polymerizable compositions (i.e., "formulations") in Table 5 are prepared in the same approach as described in example 2. DBE-712 represents dimethylsiloxane-(60-70% ethylene oxide) block copolymer from Gelest.

TABLE 5

| | Lens Formulation (weight unit parts) | | | |
|---|---|---|---|---|
| | 4-1 (Control) | 4-2 | 4-3 | 4-4# |
| PrOH | 10 | 5 | 3 | 0 |
| DBE-712 | 0 | 5 | 7 | 10 |
| DMA | 33 | 33 | 33 | 33 |
| NORBLOC | 1.50 | 1.50 | 1.50 | 1.50 |
| UV28 | 0.40 | 0.40 | 0.40 | 0.40 |
| RB247 | 0.01 | 0.01 | 0.01 | 0.01 |
| TRIS-Am | 28 | 28 | 28 | 28 |
| CE-PDMS | 40 | 40 | 40 | 40 |
| Vazo-64 | 0.50 | 0.50 | 0.50 | 0.50 |
| TOTAL = | 113.41 | 113.41 | 113.41 | 113.41 |
| Mold Separation Force (N) | 98 ± 6 | 91 ± 5 | 87 ± 6 | 81 ± 7 |
| Demold at RT | <30% | ~50% | >95% | >95% |
| Demold after cooling | ~80% | ~80% | — | — |
| Delens (BC, RT) | <5% | ~25% | ~50% | >95% |
| Delens (FC, RT) | <5% | <5% | ~70% | >95% |
| Delens (BC, cooling) | 75% | >95% | >95% | >95% |
| Delens (FC, cooling) | <5% | >95% | >95% | >95% |

Formulation 4-4 is hazy at room temperature, and spot like patterns were observed on lens edge.

Lens cast molding, curing, and post-curing treatment are the same as described in Example 2. Demold and delens process are the same as described in Example 2.

Table 5 shows that the tested silicone fluid, dimethylsiloxane-(60-70% ethylene oxide) block copolymer, can reduce average mold separation force (i.e., mold separation force) by about $$17\% \left( \frac{98-81}{98} \times 100\% \approx 17\% \right),$$

compared to use of 1-propanol as non-reactive diluent at room temperature. In addition to its incapability to form a clear SiHy lens formulation, this silicone fluid may not sufficiently reduce mold separation.

Example 5

Preparation of Polymerizable Compositions

All polymerizable compositions (i.e., "formulations") in Table 6 are prepared in the same approach as described in Example 2. DMS-C16 represents CARBINOL (HYDROXYL) TERMINATED POLYDIMETHYLSILOXANE (50-65 cSt) from Gelest.

TABLE 6

| | Lens Formulation (weight unit parts) | | | |
|---|---|---|---|---|
| CHEMICAL | 5-1 (Control) | 5-2 | 5-3 | 5-4 |
| PrOH | 10 | 0 | 10 | 0 |
| DMS-C16 | 0 | 10 | 0 | 10 |
| DMA | 33 | 33 | 33 | 33 |
| NORBLOC | 0 | 0 | 0.8 | 0.8 |
| UV28 | 0 | 0 | 0.3 | 0.3 |
| RB247 | 0.01 | 0.01 | 0.01 | 0.01 |

TABLE 6-continued

| CHEMICAL | Lens Formulation (weight unit parts) | | | |
|---|---|---|---|---|
| | 5-1 (Control) | 5-2 | 5-3 | 5-4 |
| TRIS-Am | 34 | 34 | 28 | 28 |
| CE-PDMS | 34 | 34 | 40 | 40 |
| Vazo-64 | 0.50 | 0.50 | 0.50 | 0.50 |
| TOTAL = | 113.41 | 113.41 | 113.41 | 113.41 |
| Mold Pull Force (N) | 101 ± 6 | 68 ± 5 | 98 ± 6 | 66 ± 5 |
| Demold at RT | <20% | >95% | <30% | >95% |
| Delens (BC, RT) | <5% | >95% | <5% | >95% |
| Delens (FC, RT) | <5% | >95% | <5% | >95% |

Lens cast molding, curing, and post-curing treatment are the same as described in Example 2. Demold and delens process are the same as described in Example 2.

All the publications and patents which have been cited herein above are hereby incorporated by reference in their entireties.

What is claimed is:

1. A method for producing silicone hydrogel contact lenses, comprising the steps of:
   (1) obtaining a polymerizable composition which is a clear fluid at room temperature, wherein the polymerizable composition comprises (a) at least 15% by weight of at least one hydrophilic vinylic monomer, (b) at least 15% by weight of at least one siloxane-containing polymerizable component that comprises at least one siloxane-containing vinylic monomer, at least one polysiloxane vinylic crosslinker, or a combination thereof, (c) from about 1% to about 30% by weight of at least one silicone fluid (or so-called silicone oil) which is capable of reducing mold separation force by at least 20% at room temperature compared to control formulation that comprises 1-propanol as sole non-reactive diluent and differs from the polymerizable composition only in non-reactive diluent, wherein said at least one silicone fluid is free of any ethylenically unsaturated group, does not participate in free-radical polymerization, and has a molecular weight or number-averaged molecular weight of about 2000 Daltons or less, and (d) at least one free radical initiator;
   (2) introducing the polymerizable composition into a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;
   (3) curing thermally or actinically the polymerizable composition in the lens mold to form an unprocessed SiHy contact lens;
   (4) separating the lens mold obtained in step (3) into the male and female mold halves, with the unprocessed SiHy contact lens adhered on a lens-adhered mold half which is one of the male and female mold halves;
   (5) mechanically or manually removing the unprocessed SiHy contact lens from the lens-adhered mold half before the unprocessed SiHy contact lens is contact with water or any liquid; and
   (6) subjecting the unprocessed SiHy contact lens to one or more post-molding processes selected from the group consisting of extraction, hydration, surface treatment, packaging, sterilization, and combinations thereof.

2. The method of claim 1, wherein the polymerizable composition further comprises at least one non-reactive diluent other than silicone fluid, wherein said at least one silicone fluid is present in an amount of at least 60% or 70% by weight relative to the total weight of all non-reactive diluent, wherein at least one non-reactive diluent other than silicone fluid has 1 to 8 carbon atoms and a boiling point of lower than 105° C. and is free of silicone.

3. The method of claim 1, wherein said at least one silicone fluid is a fluid polymerized compound or polymer which comprises at least two siloxane units the organic substituents of which independent of one another are selected from the group consisting of $C_1$-$C_{10}$ alkyl, $C_2$-$C_{10}$ hydroxyalkyl, $C_2$-$C_{10}$ aminoalkyl, hydroxyethoxy-$C_2$-$C_6$ alkyl, and perfluoro-substituted $C_1$-$C_{10}$ alkyl.

4. The method of claim 3, wherein said at least one silicone fluid is selected from the group consisting of hexamethyldisiloxane, octamethyltrisiloxane, decamethyltetrasiloxane, dodecamethylpentasiloxane, tetradecamethylhexasiloxane, poly(dimethylsiloxane), hexamethylcyclotrisloxane, octamethylcyckitetrasiloxane, decamethylcyclopentasiloxane, dodecamethylcyclohexasiloxane, (3-hydroxypropyl)pentamethyldisiloxane, (3-aminopropyl)pentamethyl-disiloxane, 1,3-bis(hydroxypropyl) tetramethyldisiloxane, 1,3-bis(3-hydroxyisobutyl) tetramethyl-disiloxane, 1,3-bis(4-hydroxybutyl) tetramethyldisiloxane, 1,3-bis(3-aminopropyl)tetramethyl-disiloxane, (γ-aminopropyl)heptamethyltrisiloxane, 3-(3-hydroxypropyl)-heptamethyltrisiloxane, 3-(3-aminopropyl) heptamethyltrisiloxane, 3-[hydroxy(polyethylenoxy)-propyl]heptamethyltrisiloxane, 1,3-bis(3-hydroxypropyl)-hexamethyltrisiloxane, 1,3-bis(3-aminopropyl) hexamethyltrisiloxane, 1,3-bis[hydroxy(polyethylenoxy)-propyl]hexamethyltrisiloxane, propyltris(trimethylsiloxy) silane, hydroxypropyltris(trimethylsiloxy)silane, aminopropyl-tris(trimethylsiloxy)silane, N-methylaminopropyltris(trimethylsiloxy)silane, poly[dimethylsiloxane-co-(3-aminopropyl)methylsiloxane], poly{dimethylsiloxane-co-[3-(2-(2-hydroxyethoxy) ethoxy)-propyl]methylsiloxane}, mono-hydroxypropyl-, mono-butyl-terminated poly(dimethylsiloxane), mono-hydroxyethoxypropyl-, mono-butyl-terminated poly(dimethylsiloxane), mono-aminopropyl-, mono-butyl-terminated poly (dimethylsiloxane), α,ω-bis(hydroxypropyl)-terminated poly(dimethylsiloxane), α,ω-bis(hydroxyethoxypropyl)-terminated poly(dimethylsiloxane), α,ω-bis(aminopropyl)-terminated poly(dimethylsiloxane), poly(dimethylsiloxane-co-nonafluorohexylmethylsiloxane), and combinations thereof.

5. The method of claim 4, wherein said at least one hydrophilic vinylic monomer comprises at least one hydrophilic (meth)acrylamido monomer selected from the group consisting of (meth)acrylamide, N-methyl (meth)acrylamide, N,N-dimethyl (meth)acrylamide, N-ethyl (meth)acrylamide, N,N-diethyl (meth)acrylamide, N-propyl (meth) acrylamide, N-isopropyl (meth)acrylamide, N-3-methoxypropyl (meth)acrylamide, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-4-hydroxybutyl (meth)acrylamide, N,N-bis(2-hydroxyethyl) (meth)acrylamide, N-tris(hydroxymethyl) methyl (meth)acrylamide, 2-(meth)acrylamidoglycolic acid, 3-(meth)acrylamidopropionic acid, 4-(meth)acrylamido-butanoic acid, 3-(meth)acrylamido-2-methylbutanoic acid, 3-(meth)acrylamido-3-methylbutanoic acid, 2-(meth)acrylamido-2-methyl-3,3-dimethyl butanoic acid, 5-(meth)acrylamidopentanoic acid, 3-(meth)acrylamidohaxanoic acid, 4-(meth)acrylamido-3,3-dimethylhexanoic acid, (3-(meth)acrylamidophenyl)boronic acid, 3-((3-methacrylamidopropyl)dimethylammonio)-propane-1-sulfonate; 3-((3-acrylamidopropyl)dimethylammonio)propane-1-sulfonate, N-2-aminoethyl (meth)acrylamide, N-2-methylaminoethyl (meth)acrylamide, N-2-ethylaminoethyl (meth) acrylamide, N-2-dimethylaminoethyl (meth)acrylamide, N-3-aminopropyl (meth)acrylamide, N-3-methylaminopropyl (meth)acrylamide, N-3-dimethylaminopropyl (meth) acrylamide, poly(ethylene glycol)ethyl (meth)acrylamide having a number average molecular weight of up to 700, methoxy-poly(ethylene glycol)ethyl (meth)acrylamide having a number average molecular weight of up to 700, and combinations thereof.

6. The method of claim 4, wherein said at least one hydrophilic vinylic monomer comprises:
  (i) at least one hydrophilic (meth)acryloxy monomer selected from the group consisting of 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, (meth)acrylic acid, ethylacrylic acid, propylacrylic acid, butylacrylic acid, 2-aminoethyl (meth) acrylate, 2-methylaminoethyl (meth)acrylate, 2-ethylaminoethyl (meth)acrylate, 3-aminopropyl (meth) acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, and combinations thereof;
  (ii) at least one hydrophilic N-vinyl amide monomer selected from the group consisting of N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof;
  (iii) at least one methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof;
  (iv) at least one vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, polyethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof;
  (v) at least one allyl ether monomer selected from the group consisting of ethylene glycol monoallyl ether, di(ethylene glycol) monoallyl ether, tri(ethylene glycol) monoallyl ether, tetra(ethylene glycol) monoallyl ether, polyethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof;
  (vi) at least one phosphorylcholine-containing vinylic monomer selected from the group consisting of (meth) acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]-ethyl-2'-(trimethylammonio)-ethylphosphate, 3-[(meth)acryloylamino]propyl-2'-(trimethylammonio)ethylphosphate, 4-[(meth) acryloylamino]butyl-2'-(trimethylammonio)-ethylphosphate, 5-((meth)acryloyloxy)pentyl-2'-(trimethylammonio)ethyl phosphate, 6-((meth) acryloyloxy)hexyl-2'-(trimethylammonio)-ethylphosphate, 2-((meth)acryloyloxy)-ethyl-2'-(triethylammonio)ethylphosphate, 2-((meth) acryloyloxy)ethyl-2'-(tripropylammonio)ethylphosphate, 2-((meth)acryloyloxy)ethyl-2'-(tributylammonio)ethyl phosphate, 2-((meth) acryloyloxy)propyl-2'-(trimethylammonio)-ethylphosphate, 2-((meth)acryloyloxy)butyl-2'-(trimethylammonio)ethylphosphate, 2-((meth) acryloyloxy)-pentyl-2'-(trimethylammonio) ethylphosphate, 2-((meth)acryloyloxy)hexyl-2'-(trimethylammonio)ethyl phosphate, 2-(vinyloxy) ethyl-2'-(trimethylammonio)-ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)-ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof;
  (vii) allyl alcohol;
  (viii) N-2-hydroxyethyl vinyl carbamate;
  (ix) N-vinyloxycarbonyl-β-alanine (VINAL);
  (x) N-vinyloxycarbonyl-α-alanine; or
  (xi) combinations thereof.

7. The method of claim 4, wherein the component (b) comprises at least one siloxane-containing (meth)acrylamido monomer containing a tris(trialkylsiloxy)silyl group or a bis(trialkylsilyloxy)-alkylsilyl group and/or at least one mono-(meth)acrylamido-terminated oligo- or polysiloxane of formula (IIa)

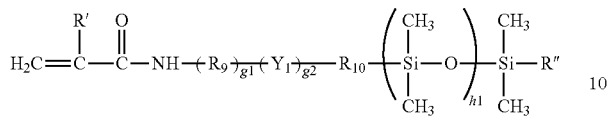
(IIa)

in which R' is hydrogen or methyl, R'' independent of each other is $C_1$-$C_6$ alkyl, g1 and g2 independent of each other are integer of 0 or 1, h1 is an integer of 2 to 25, $R_9$ and $R_{10}$ independent of each other are a substituted or unsubstituted $C_1$-$C_{10}$ alkylene divalent radical, $Y_1$ is a linkage of

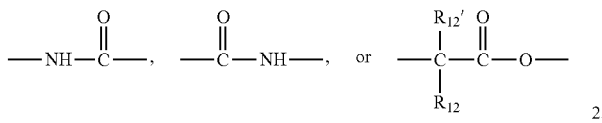

in which $R_{12}$ and $R_{12}'$ independent of each other are $C_1$-$C_6$ alkyl.

8. The method of claim 7, wherein said at least one siloxane-containing (meth)acrylamido monomer containing a tris(trialkylsiloxy)silyl group is selected from the group consisting of N-[tris(trimethylsiloxy)silylpropyl] (meth)acrylamide, N-[tris(dimethylethylsiloxy)-silylpropyl](meth)acrylamide, N-[tris(dimethylpropylsiloxy)silylpropyl] (meth)acrylamide, N-[tris(dimethylphenylsiloxy)silylpropyl] (meth)acrylamide, N-(2-hydroxy-3-(3-(tris(trimethylsilyloxy)silyl)propyloxy)propyl)-2-methyl (meth)acrylamide, N-(2-hydroxy-3-(3-(tris(trimethylsilyloxy)silyl)propyloxy)propyl) (meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyl)propyloxy)propyl] (meth)acrylamide, and combinations thereof, wherein said at least one siloxane-containing (meth)acrylamido monomer containing a bis(trialkylsilyloxy)alkylsilyl group is selected from the group consisting of N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)-propyl] (meth)acrylamide, N-[2-hydroxy-3-(3-(t-butyldimethylsilyl)propyloxy)propyl]-2-methyl acrylamide, a siloxane-containing (meth)acrylamido monomer of one of formula (Ia) to (Ih), and combinations thereof,

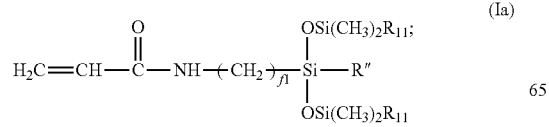
(Ia)

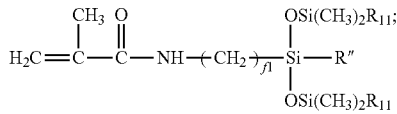
(Ib)

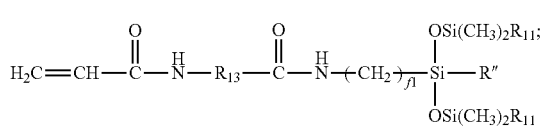
(Ic)

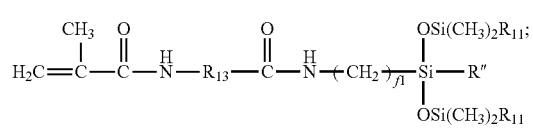
(Id)

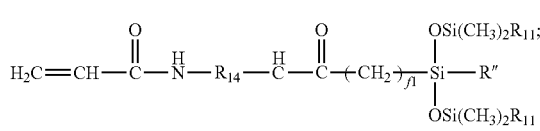
(Ie)

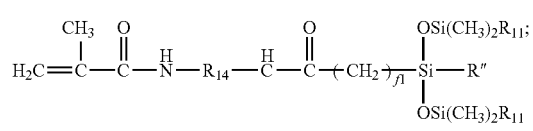
(If)

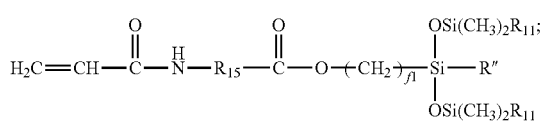
(Ig)

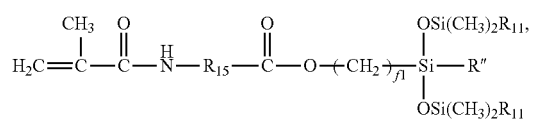
(Ih)

in which $R_{13}$ is a divalent alkylene radical of

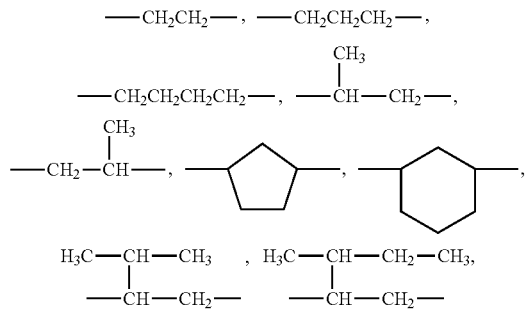

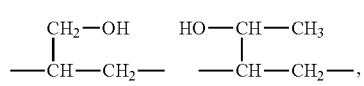

-continued

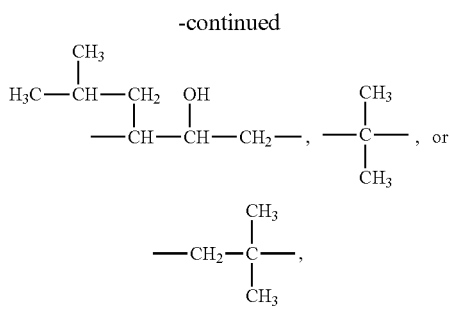

$R_{14}$ is a divalent alkylene radical of —$CH_2CH_2$— or —$CH_2CH_2CH_2$—, and $R_{15}$ is a divalent alkylene radical of

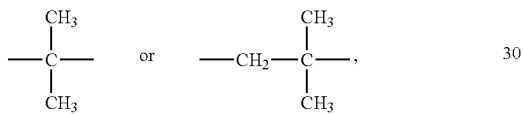

R" and $R_{11}$ independent of each other is $C_1$-$C_4$ alkyl, and f1 is an integer of from 3 to 5;

wherein at least one mono-(meth)acrylamido-terminated oligo- or polysiloxane is selected from the group consisting of α-(meth)acryloyl-amidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxy-propyl]-terminated ω-$C_1$-$C_4$-alkyl terminated polydimethylsiloxane, α-[3-(meth)acrylamido-isopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl]terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethyl-butylsilane) (meth)acrylamide, (meth)acryloylamidopropyltetra(dimethylsiloxy)-dimethylbutylsilane, and combinations thereof.

9. The method of claim 8, wherein the component (b) comprises
(1) at least one polysiloxane vinylic crosslinker selected from the group consisting of: an α,ω-(meth)acryloxy-terminated polydimethylsiloxane; an α,ω-(meth)acrylamido-terminated polydimethylsiloxane; an α,ω-vinyl carbonate-terminated polydimethylsiloxane; an α,ω-vinyl carbamate-terminated polydimethylsiloxane; a bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane of various molecular weight; a reaction product of glycidyl methacrylate with a di-amino-functionalized polydimethylsiloxane; a reaction product of an azlactone-containing vinylic monomer with a d-hydroxyl-functionalized polydimethylsiloxane; and combinations thereof;
(2) at least one polysiloxane vinylic crosslinker of formula (H)

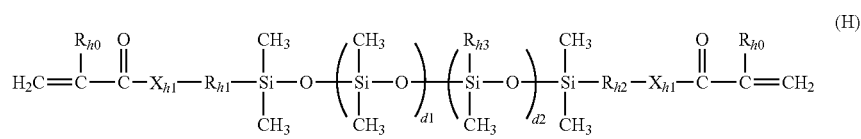

in which:

d1 is an integer of from 30 to 500 and d2 is an integer of from 1 to 75, provided that d2/d1 is from about 0.035 to about 0.15 (preferably from about 0.040 to about 0.12, even more preferably from about 0.045 to about 0.10);

$X_{h1}$ is O or $NR_{hN}$ in which $R_{hN}$ is hydrogen or $C_1$-$C_{10}$-alkyl;

$R_{h0}$ is hydrogen or methyl;

$R_{h1}$ and $R_{h2}$ independently of each other are a substituted or unsubstituted $C_1$-$C_{10}$ alkylene divalent radical or a divalent radical of —$R_{h4}$—O—$R_{h5}$— in which $R_{h4}$ and $R_{h5}$ independently of each other are a substituted or unsubstituted $C_1$-$C_{10}$ alkylene divalent radical;

$R_{h3}$ is a monovalent radical of any one of formula (H-a) to (H-e)

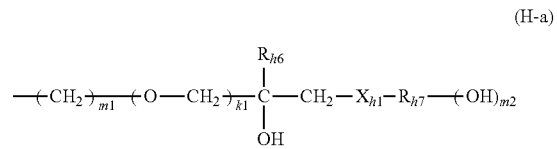

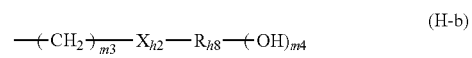

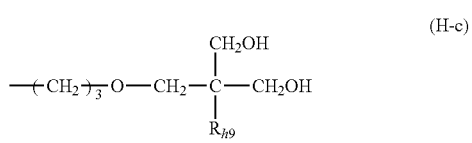

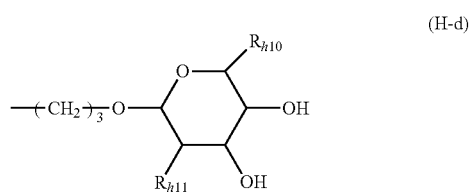

-continued

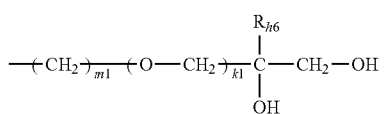

(H-e)

k1 is zero or 1; m1 is an integer of 2 to 4; m2 is an integer of 1 to 5; m3 is an integer of 3 to 6; m4 is an integer of 2 to 5;

$R_{h6}$ is hydrogen or methyl;

$R_{h7}$ is a $C_2$-$C_6$ hydrocarbon radical having (m2+1) valencies;

$R_h$s is a $C_2$-$C_6$ hydrocarbon radical having (m4+1) valencies;

$R_{h9}$ is ethyl or hydroxymethyl;

$R_{h10}$ is methyl or hydromethyl;

$R_{h11}$ is hydroxyl or methoxy;

$X_{h1}$ is a sulfur linkage of —S— or a teriary amino linkage of —$NR_{h12}$— in which $R_{h12}$ is $C_1$-$C_1$ alkyl, hydroxyethyl, hydroxypropyl, or 2,3-dihydroxypropyl; and $X_{h2}$ is a linkage of

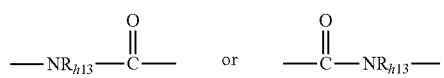

in which $R_{h13}$ is hydrogen or $C_1$-$C_{10}$ alkyl;

(3) at least one polysiloxane vinylic crosslinker having one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups;

(4) at least one chain-extended polysiloxane vinylic crosslinker having at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups;

(5) at least one polysiloxane vinylic crosslinker selected from the group consisting of α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethyl-amino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy) propyl]-terminated polydimethylsiloxane, and combinations thereof;

(6) at least one polysiloxane vinylic crosslinker having a polymer chain segment (i.e., a divalent radical) of

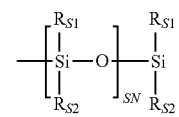

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{18}$ fluoroalkyl; $C_1$-$C_{10}$ fluoroether; aryl; aryl $C_1$-$C_{18}$ alkyl; -alk-$(OC_2H_4)_{\gamma 1}$—$OR°$ (in which alk is $C_1$-$C_6$ alkylene diradical, $R°$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, or a linear hydrophilic polymer chain, in which $R_{N1}$ and $R_{N1}'$ independent of each other are hydrogen or a $C_1$-$C_{15}$ alkyl;

(7) at least one polysiloxane vinylic crosslinker of formula (1) or (2)

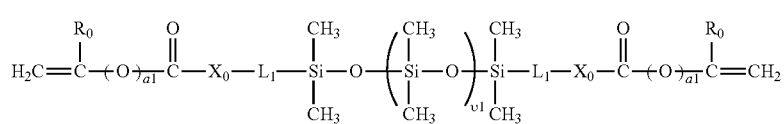
(1)

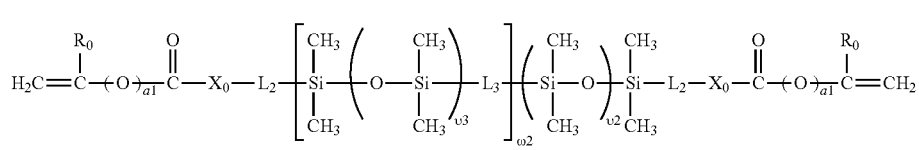
(2)

in which:

$R_0$ is H or methyl;

v1 is an integer of from 30 to 500; v2 and v3 independent of each other are an integer of from 5 to 100; ω2 and ω3 independent of each other are an integer of from 1 to 15;

a1 and g1 independent of each other is zero or 1;

$L_1$ is a $C_2$-$C_8$ alkylene divalent radical or a divalent radical of

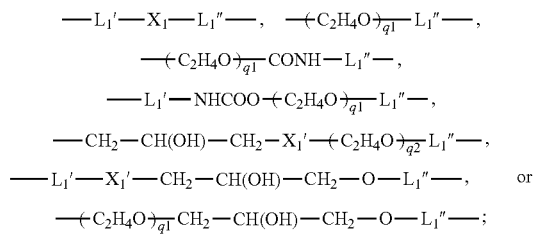

$L_1'$ is a $C_2$-$C_8$ alkylene divalent radical which has zero or one hydroxyl group;

$L_1''$ is $C_3$-$C_8$ alkylene divalent radical which has zero or one hydroxyl group;

$L_2$ is a divalent radical of

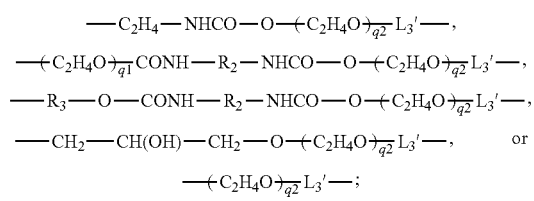

$L_3$ is a divalent radical of

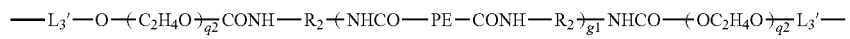

in which PE is a divalent radical of

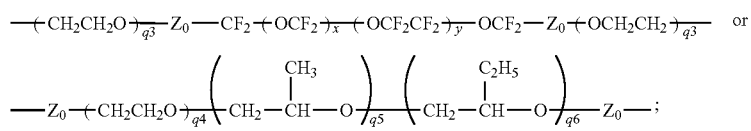

$L_3'$ is $C_3$-$C_8$ alkylene divalent radical;

$R_2$ is a $C_4$-$C_{14}$ hydrocarbon divalent radical;

$R_3$ is a $C_2$-$C_6$ alkylene divalent radical;

$X_o$, $X_1'$, and $X_{o1}$ independent of one another are O or $NR_1$;

$X_1$ is O, $NR_1$, NHCOO, OCONH, $CONR_1$, or $NR_1CO$;

$Z_0$ is a direct bond or a $C_1$-$C_{12}$ alkylene divalent radical; or (8) combinations thereof.

10. The method of claim 8, wherein the component (b) comprises:

(1) at least one siloxane-containing vinylic monomer of formula (M1) or (M2):

$$H_2C=\overset{R_{M0}}{\underset{}{C}}\!\!-\!\!(O)_{a_{M1}}\!\!-\!\!\overset{O}{\underset{}{C}}\!\!-\!\!O\!\!-\!\!L_{M1}\!\!-\!\!\left(\overset{CH_3}{\underset{CH_3}{Si}}\!\!-\!\!O\right)_{\!n1}\!\!\overset{CH_3}{\underset{CH_3}{Si}}\!\!-\!\!R_{t1} \quad (M1)$$

$$H_2C=\overset{R_{M0}}{\underset{}{C}}\!\!-\!\!(O)_{a_{M1}}\!\!-\!\!\overset{O}{\underset{}{C}}\!\!-\!\!O\!\!-\!\!L_{M1}\!\!-\!\!Si\!\left(\!\!\overset{O-Si(CH_3)_2CH_3}{\underset{R_{t2}}{}}\!\!\right)_{\!r1}\!\!(R_{t2})_{3-r1} \quad (M2)$$

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of —$L_{M1}'$—$X_{M1}$—$L_{M1}''$—, —(C$_2$H$_4$O)$_{\overline{v1}}$CONH—$L_{M1}''$—, —(C$_2$H$_4$O)$_{\overline{v1}}$—$L_{M1}''$—, —$L_{M1}'$—NHCOO—(C$_2$H$_4$O)$_{\overline{v1}}$—$L_{M1}''$—, —CH$_2$—CH(OH)—CH$_2$—$X_{M1}'$—(C$_2$H$_4$O)$_{\overline{v2}}$—$L_{M1}''$—, -continued

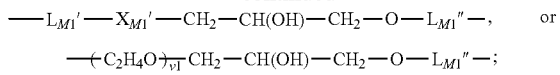

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{r1}$ and $R_{r2}$ independent of each other are a $C_1$-$C_6$ alkyl; $X_{M1}'$ is O or $NR_1$; v1 is an integer of 1 to 30; m2 is an integer of 0 to 30; n1 is an integer of 3 to 40; and r1 is an integer of 2 or 3;

(2) at least one non-silicone hydrophobic vinylic monomer;

(3) at least one non-silicone vinylic crosslinker;

(4) at least one UV-absorbing vinylic monomer and/or at least one UV/HEVL-Absorbing vinylic monomer;

(5) at least one photochromic vinylic monomer; or (6) combinations thereof.

11. The method of claim 8, wherein step of curing is performed actinically with a UV or visible light.

12. The method of claim 11, wherein step of curing is performed actinically with a visible light in a region of from 420 nm to 500 nm, wherein said at least one free radical initiator comprises a benzoylphosphine initiator and/or an acylgermanium photoinitiator.

13. The method of claim 8, wherein said at least one free radical initiator comprises a thermal polymerization initiator, wherein the step of curing is carried out thermally in an oven at one or more curing temperatures of from about 45° C. to about 100° C. under a nitrogen environment for at least 45 minutes to form an unprocessed silicone hydrogel lens contact lens, wherein the nitrogen environment in the oven is maintained by flowing nitrogen gas through the oven at a first flow rate.

14. The method of claim 13, further comprising a post-curing treatment process between steps (3) and (4).

15. The method of claim 14, wherein the post-curing treatment process comprises the steps of: raising oven temperature to a post-curing temperature of about 110° C. or higher while increasing the flow rate of nitrogen gas through the oven to a second flow rate which is at least about 2.0 folds of the first flow rate; and heating the lens mold with the unprocessed silicone hydrogel contact lens therewithin in the oven at the post-curing temperature under nitrogen gas flow through the oven at the second flow rate for at least about 30 minutes.

16. The method of claim 13, wherein the lens mold with the unprocessed silicone hydrogel contact lens therewithin is heated in the oven at the post-curing temperature for at least 60 minutes.

17. The method of claim 8, wherein the step (5) of removing is performed, before the unprocessed silicone hydrogel contact lens is contact with water or any liquid, by (a) bring a ultrasonic horn in direct contact with at least one area of a non-optical surface of the lens-adhered mold half having the unprocessed silicone hydrogel lens precursor attached thereon and (b) applying a ultrasonic vibrational energy of from about 0.2 to about 18 J to the at least one area of the non-optical surface of the lens-adhered mold half having the unprocessed silicone hydrogel contact lens adhered thereon so as to remove the unprocessed silicone hydrogel contact lens from the lens-adhered mold half.

18. The method of claim 11, further comprising a step of subjecting the unprocessed silicone hydrogel contact lens obtained in step (5) to one or more post-molding processes selected from the group consisting of extraction, hydration, surface treatment, packaging, sterilization, and combinations thereof.

19. The method of claim 13, further comprising a step of subjecting the unprocessed silicone hydrogel contact lens obtained in step (5) to one or more post-molding processes selected from the group consisting of extraction, hydration, surface treatment, packaging, sterilization, and combinations thereof.

* * * * *